US012100237B2

(12) United States Patent
Harada et al.

(10) Patent No.: US 12,100,237 B2
(45) Date of Patent: Sep. 24, 2024

(54) IMAGE PROCESSING DEVICE, AND NON-TRANSITORY COMPUTER-READABLE MEDIUM FOR IMPROVEMENT OF ACCURACE OF A SUBJECT CAPTURED IN AN IMAGE ACQUIRED BY AN IMAGING DEVICE, AND SKELETON MODEL ESTIMATION BASED ON HIDDEN BODY PART ESTIMATION

(71) Applicant: KABUSHIKI KAISHA TOKAI RIKA DENKI SEISAKUSHO, Aichi (JP)

(72) Inventors: Hisamitsu Harada, Aichi (JP); Yasunori Tsukahara, Aichi (JP); Motoki Kajita, Aichi (JP); Tadashi Sekihara, Tokyo (JP); Erina Kitahara, Tokyo (JP); Yasutoshi Fukaya, Tokyo (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/766,928

(22) PCT Filed: Sep. 23, 2020

(86) PCT No.: PCT/JP2020/035797
§ 371 (c)(1),
(2) Date: Apr. 6, 2022

(87) PCT Pub. No.: WO2021/070612
PCT Pub. Date: Apr. 15, 2021

(65) Prior Publication Data
US 2023/0018900 A1    Jan. 19, 2023

(30) Foreign Application Priority Data
Oct. 7, 2019    (JP) .................................. 2019-184714

(51) Int. Cl.
*G06V 40/10*    (2022.01)
*G06V 10/44*    (2022.01)

(52) U.S. Cl.
CPC ............ *G06V 40/103* (2022.01); *G06V 10/44* (2022.01)

(58) Field of Classification Search
CPC ........................... G06V 40/103; G06V 10/44
See application file for complete search history.

(56) References Cited

U.S. PATENT DOCUMENTS 9,165,199 B2 * 10/2015 Zhu ........................ G06V 10/24
2010/0215257 A1    8/2010 Dariush et al.
(Continued)

FOREIGN PATENT DOCUMENTS

CN    104063677 B  *  4/2019 ......... G06K 9/00369
JP    2011-123733    6/2011
(Continued)

OTHER PUBLICATIONS

"Georgios Th. Papadopoulos et. al., Real-Time Skeleton-Tracking-Based Human Action Recognition Using Kinect Data, 2014, International Conference on Multimedia Modeling, MMM 2014: MultiMedia Modeling, pp. 473-483" (Year: 2014).*
(Continued)

*Primary Examiner* — Andrae S Allison
*Assistant Examiner* — Phuong Hau Cai
(74) *Attorney, Agent, or Firm* — GREENBLUM & BERNSTEIN, P.L.C.

(57) ABSTRACT

An image processing device for improving accuracy of discrimination of hidden portions of a subject captured in an image is disclosed. In this regard the image processing device receives image data of an image in which a person is captured. Based on the received image data, the image processing device estimates a hidden body part of the person that is not captured in the image due to obstruction by another body part of the person. Such estimation is performed by detecting first feature points included in a left limb of the person and second feature points included in a right limb of the person, and estimating at least one of the first feature points and the second feature points are to be (Continued)

included in a hidden body part that is obstructed by another body part of the person or a non-hidden body part.

6 Claims, 18 Drawing Sheets

(56) References Cited

U.S. PATENT DOCUMENTS

| | | |
|---|---|---|
| 2010/0215271 A1 | 8/2010 | Dariush et al. |
| 2013/0259391 A1 | 10/2013 | Kawaguchi et al. |
| 2017/0213360 A1 | 7/2017 | Kawaguchi et al. |

FOREIGN PATENT DOCUMENTS

| | | | |
|---|---|---|---|
| JP | 2012-155391 | 8/2012 | |
| JP | 2012-518857 | 8/2012 | |
| JP | 2017-91377 | 5/2017 | |
| WO | WO-2012046392 A1 * | 4/2012 | ......... G06K 9/00342 |

OTHER PUBLICATIONS

"Fadel Adib et al., Capturing the Human Figure Through a Wall, 2015, ACM Transactions on Graphics, vol. 34, Issue 6, Article No. 219, pp. 1-13" (Year: 2015).*

International Search Report issued in International Patent Application No. PCT/JP2020/035797, dated Dec. 8, 2020.

* cited by examiner

IMAGE PROCESSING DEVICE, AND NON-TRANSITORY COMPUTER-READABLE MEDIUM FOR IMPROVEMENT OF ACCURACE OF A SUBJECT CAPTURED IN AN IMAGE ACQUIRED BY AN IMAGING DEVICE, AND SKELETON MODEL ESTIMATION BASED ON HIDDEN BODY PART ESTIMATION

FIELD

The presently disclosed subject matter relates to an image processing device, and a non-transitory computer-readable medium having recorded a computer program executable by a processor of the image processing device.

BACKGROUND

For example, as disclosed in Japanese Patent Publication No. 2017-091377A, it is known a technique in which a skeleton model simulating a human body is applied to a subject captured in an image acquired by an imaging device, thereby discriminating the skeleton, the posture, and the like of the subject.

SUMMARY

Technical Problem

It is demanded to improve the accuracy of discrimination of a subject captured in an image acquired by the imaging device.

Solution to Problem

In order to meet the demand described above, an illustrative aspect of the presently disclosed subject matter provides an image processing device, comprising:
  a reception interface configured to receive image data corresponding to an image in which a person is captured; and
  a processor configured to estimate, based on the image data, a hidden body part of the person that is not captured in the image due to obstruction by another body part of the person,
  wherein the processor is configured to:
    detect, based on the image data, a plurality of first feature points included in a left limb of the person and a plurality of second feature points included in a right limb of the person; and
    in a case where at least one of the first feature points is estimated to be included in the hidden body part and at least one of the second feature points is estimated to be included in the hidden body part, handle one of all the first feature points and all the second feature points as feature points included in the hidden body part, and handle the other one of all the first feature points and all the second feature points as feature points included in a non-hidden body part that is captured in the image without being obstructed by another body part of the person.

In order to meet the demand described above, an illustrative aspect of the presently disclosed subject matter provides a non-transitory computer-readable medium having stored a computer program adapted to be executed by a processor of an image processing device, the computer program being configured, when executed, to cause the image processing device to:
  receive image data corresponding to an image in which a person is captured;
  detect, based on the image data, a plurality of first feature points included in a left limb of the person and a plurality of second feature points included in a right limb of the person; and
  in a case where at least one of the first feature points is estimated to be included in a hidden body part of the person that is not captured in the image due to obstruction by another body part of the person and at least one of the second feature points is estimated to be included in the hidden body part, handle one of all the first feature points and all the second feature points as feature points included in the hidden body part, and handle the other one of all the first feature points and all the second feature points as feature points included in a non-hidden body part that is captured in the image without being obstructed by another body part of the person.

According to the processing as described above, it is possible to correct an unnatural estimation result relating to the hidden body part. Accordingly, it is possible to improve the accuracy of discrimination of the subject captured in the image acquired by the imaging device.

The image processing device may be configured such that:
  an index indicative of estimation reliability is assigned to each of the first feature points and the second feature points;
  the processor is configured to:
    calculate a first representative value of the indices assigned to the first feature points;
    calculate a second representative value of the indices assigned to the second feature points; and
    handle one of all the first feature points and all the second feature points that is associated with a lower one of the first representative value and the second representative value as the feature points included in the hidden body part.

The computer-readable medium may be configured such that:
  an index indicative of estimation reliability is assigned to each of the first feature points and the second feature points; and
  the computer program is configured to cause, when executed, the image processing device to:
    calculate a first representative value of the indices assigned to the first feature points;
    calculate a second representative value of the indices assigned to the second feature points; and
    handle one of all the first feature points and all the second feature points that is associated with a lower one of the first representative value and the second representative value as the feature points included in the hidden body part.

According to the processing as described above, it is possible to correct an unnatural estimation result relating to the hidden body part with a relatively high accuracy.

The image processing device may be configured such that the processor is configured to:
  count a first value that is the number of at least one first feature point estimated to be included in the hidden body part among the first feature points;

count a second value that is the number of at least one second feature point estimated to be included in the hidden body part among the second feature points; and handle one of the at least one first feature point and the at least one second feature point associated with a higher one of the first value and the second value as a feature point included in the hidden body part.

The computer-readable medium may be configured such that the computer program is configured to cause, when executed, the image processing device to:

count a first value that is the number of at least one first feature point estimated to be included in the hidden body part among the first feature points;

count a second value that is the number of at least one second feature point estimated to be included in the hidden body part among the second feature points; and handle one of the at least one first feature point and the at least one second feature point associated with a higher one of the first value and the second value as a feature point included in the hidden body part.

According to the processing as described above, it is possible to correct an unnatural estimation result relating to the hidden body part with relatively simple processing.

DESCRIPTION OF EMBODIMENTS

Figure 1:
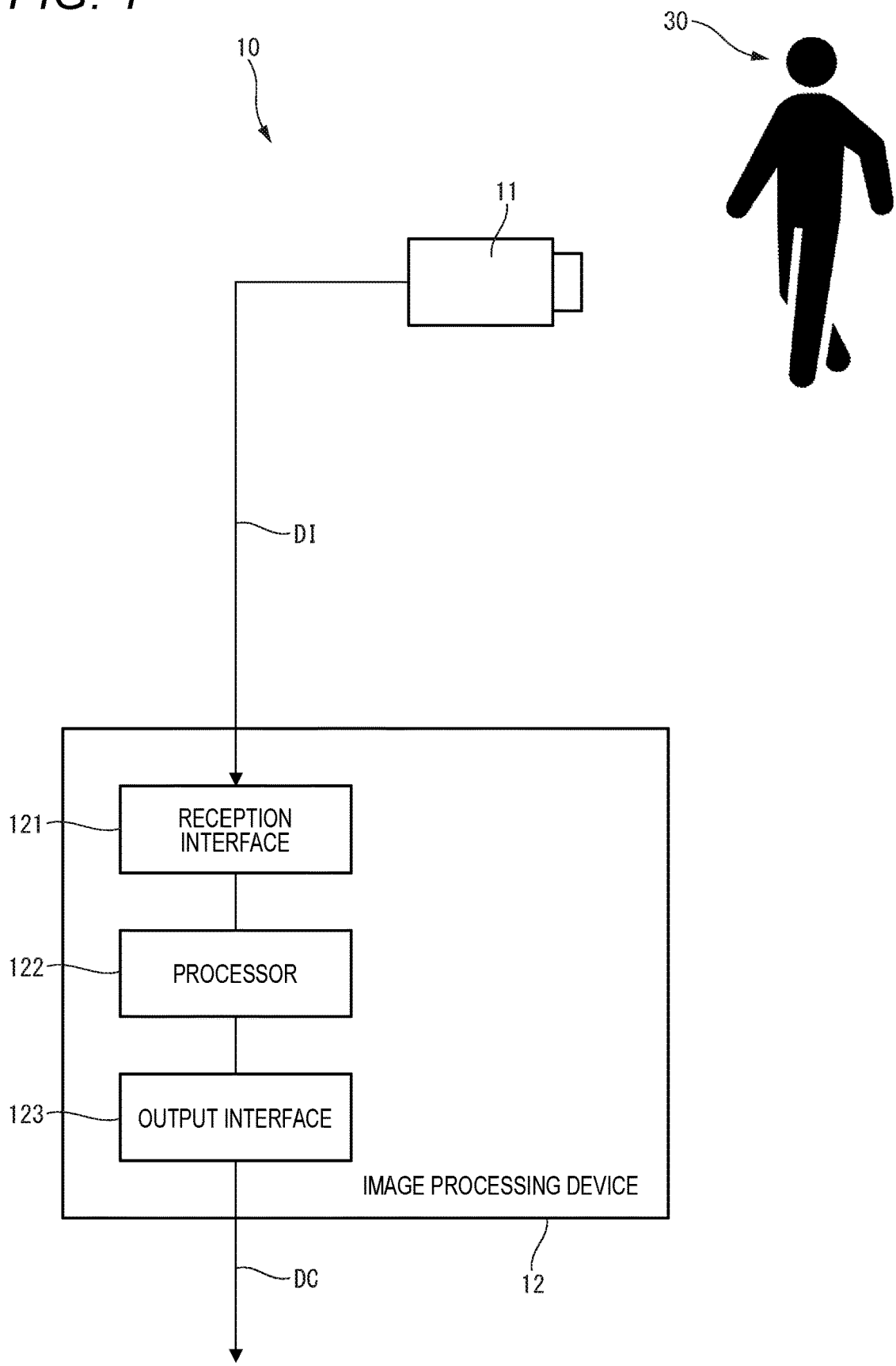
FIG. 1 illustrates a functional configuration of an image processing system according to an embodiment.

Examples of embodiments will be described in detail below with reference to the accompanying drawings. FIG. 1 illustrates a functional configuration of an image processing system 10 according to an embodiment. The image processing system 10 includes an imaging device 11 and an image processing device 12.

The imaging device 11 is a device for acquiring an image of a prescribed imaging area. Examples of the imaging device 11 include a camera and an image sensor. The imaging device 11 is configured to output image data DI corresponding to the acquired image. The image data DI may be analog data or digital data.

The image processing device 12 includes a reception interface 121, a processor 122, and an output interface 123.

The reception interface 121 is configured as an interface for receiving the image data DI. In a case where the image data DI is analog data, the reception interface 121 includes an appropriate conversion circuit including an A/D converter.

The processor 122 is configured to process the image data DI in the form of digital data. The details of the processing performed by the processor 122 will be described later. Based on the result of the processing, the processor 122 allows the output of the control data DC from the output interface 123. The control data DC is data for controlling the operation of various controlled devices. The control data DC may be digital data or analog data. In a case where the control data DC is analog data, the output interface 123 includes an appropriate conversion circuit including a D/A converter.

Figure 2:
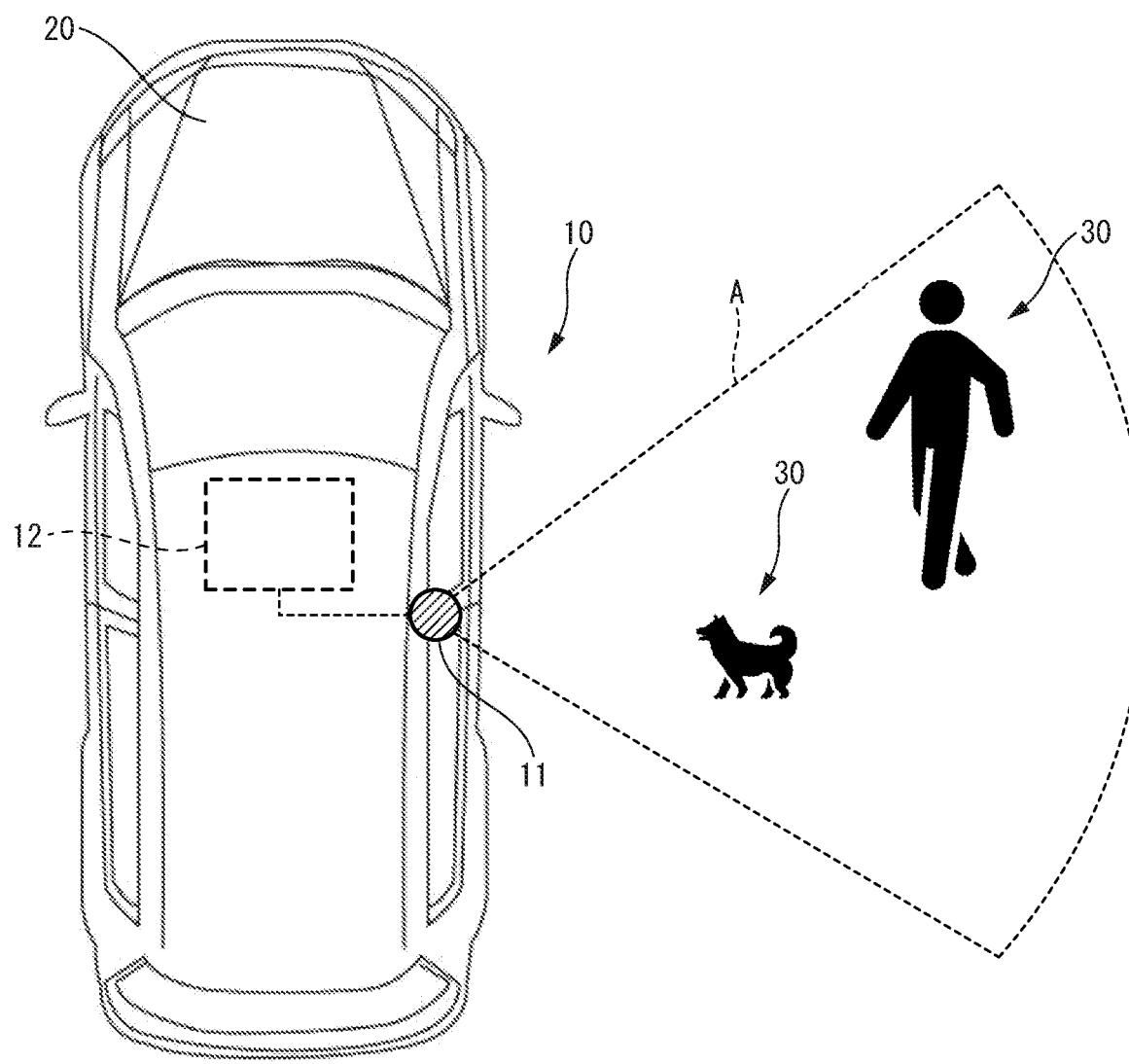
FIG. 2 illustrates a case where the image processing system of FIG. 1 is installed in a vehicle.

The image processing system 10 may be installed in a vehicle 20 as illustrated in FIG. 2, for example. In this case, examples of the controlled device whose operation is to be controlled by the above-described control data DC include a door opening/closing device, a door locking device, an air conditioner, a lighting device, and an audio-visual equipment in the vehicle 20.

The imaging device 11 is disposed at an appropriate position in the vehicle 20 in accordance with a desired imaging area. The image processing device 12 is disposed at an appropriate position in the vehicle 20. In this example, the imaging device 11 is disposed on a right side portion of the vehicle 20, and defines an imaging area A on the right side of the vehicle 20. In other words, the imaging device 11 acquires an image of the imaging area A.

Various subjects 30 may enter the imaging area A. When the subject 30 enters the imaging area A, the subject 30 is captured in an image acquired by the imaging device 11. The subject 30 captured in the image is reflected in the image data DI.

The image processing system 10 has a function of estimating the skeleton of the person in a case where the subject 30 is human.

In order to realize the above-described function, the processor 122 is configured to perform processing, with respect to the image data DI, for applying a skeleton model to the subject 30 captured in the image acquired by the imaging device 11.

Figure 3:
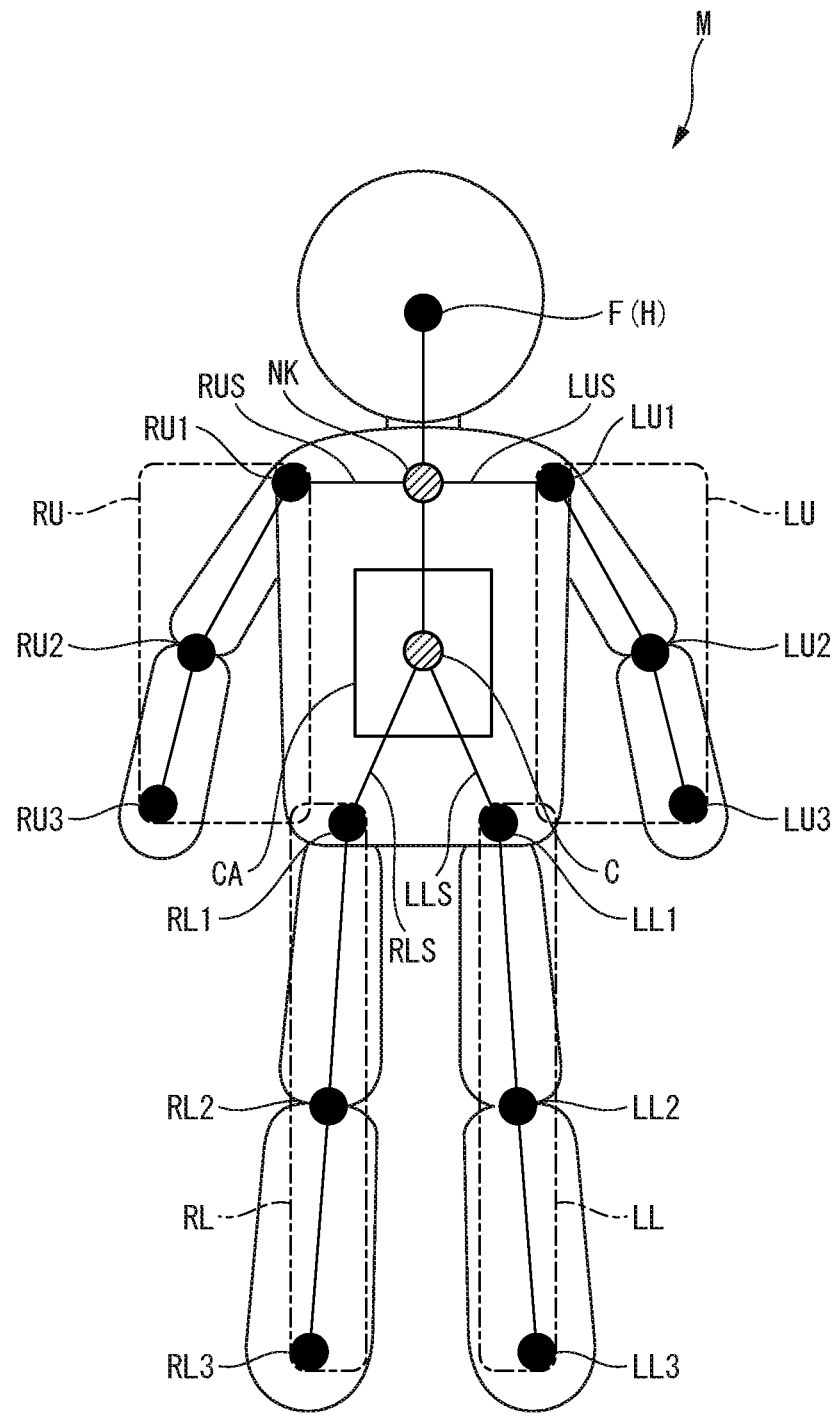
FIG. 3 illustrates a skeleton model used in the image processing system of FIG. 1.

Specifically, the skeleton model M illustrated in FIG. 3 is employed. The skeleton model M includes a center area CA including a center feature point C corresponding to the center of the model human body. The skeleton model M includes a left upper limb group LU, a right upper limb group RU, a left lower limb group LL, and a right lower limb group RL.

The left upper limb group LU includes a plurality of feature points corresponding to a plurality of characteristic parts in the left upper limb of the model human body. Specifically, the left upper limb group LU includes a left shoulder feature point LU1, a left, elbow feature point LU2, and a left wrist feature point LU3. The left shoulder feature point LU1 is a point corresponding to the left shoulder of the model human body. The left elbow feature point LU2 is a point corresponding to the left elbow of the model human body. The left wrist feature point LU3 is a point corresponding to the left wrist of the model human body.

The right upper limb group RU includes a plurality of feature points corresponding to a plurality of characteristic parts in the right upper limb of the model human body. Specifically, the right upper limb group RU includes a right shoulder feature point RU1, a right elbow feature point RU2, and a right wrist feature point RU3. The right shoulder feature point RU1 is a point corresponding to the right shoulder of the model human body. The right elbow feature point RU2 is a point corresponding to the right elbow of the model human body. The right wrist feature point RU3 is a point corresponding to the right wrist of the model human body.

The left lower limb group LL includes a plurality of feature points corresponding to a plurality of characteristic parts in the left lower limb of the model human body. Specifically, the left lower limb group LL includes a left hip feature point LL1, a left knee feature point LL2, and a left ankle feature point LL3. The left hip feature point LL1 is a point corresponding to the left portion of the hips of the model human body. The left knee feature point LL2 is a point corresponding to the left knee of the model human body. The left ankle feature point LL3 is a point corresponding to the left ankle of the model human body.

The right lower limb group RL includes a plurality of feature points corresponding to a plurality of characteristic parts in the right lower limb of the model human body. Specifically, the right lower limb group RL includes a right hip feature point RL1, a right knee feature point RL2, and a right ankle feature point RL3. The right hip feature point RL1 is a point corresponding to the right portion of the hips of the model human body. The right knee feature point RL2 is a point corresponding to the right knee of the model human body. The right ankle feature point RL3 is a point corresponding to the right ankle of the model human body.

The left upper limb group LU is connected to the center area CA via a left upper skeleton line LUS. The right upper limb group RU is connected to the center area CA via a right upper skeleton line RUS. The left lower limb group LL is connected to the center area CA via a left lower skeleton line LLS. The right lower limb group RL is connected to the center area CA via a right lower skeleton line RLS. That is, in the skeleton model M, a plurality of feature points corresponding to the limbs of the model human body are connected to the center feature point C of the model human body.

More specifically, the skeleton model M includes a face feature point F and a neck feature point NK. The face feature point F is a point corresponding to the face of the model human body. The neck feature point NK is a point corresponding to the neck of the model human body. The face feature point F, the left upper limb group LU, and the right upper limb group RU are connected to the center area CA via the neck feature point NK. The face feature point F can be replaced with a head feature point H. The head feature point H is a point corresponding to the head center of the model human body.

As used herein, the term "processing for applying a skeleton model" means processing for detecting a plurality of feature points defined in the skeleton model in a subject captured in an image acquired by the imaging device 11, and connecting the feature points with a plurality of skeleton connection lines defined in the skeleton model.

Figure 4:
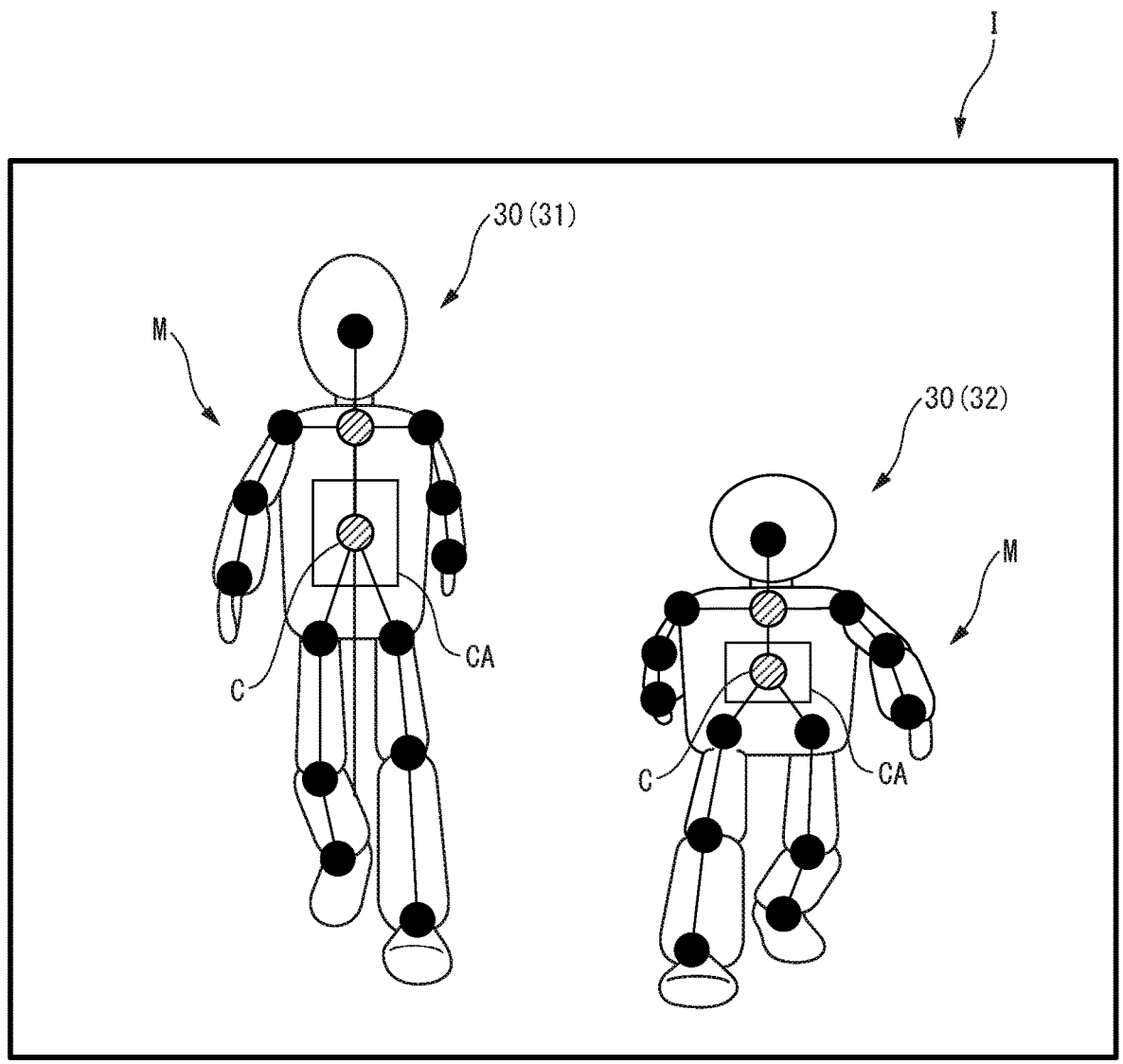
FIG. 4 illustrates a case where the skeleton model of FIG. 3 is applied to subjects.

FIG. 4 illustrates an example in which the skeleton model M is applied to a plurality of persons 31 and 32 as the subject 30 captured in an image I acquired by the imaging device 11.

By employing the skeleton model M in which the feature points corresponding to the limbs of the human body are connected to the center feature point C corresponding to the center of the human body, as described above, estimation of a more realistic human skeleton is enabled. In a case where a posture and/or a motion of a person captured in the image I is to be estimated, for example, based on the fact that the more realistic skeleton is estimated, it is possible to provide an estimation result with higher accuracy. Accordingly, it is possible to improve the accuracy of discrimination of the subject 30 captured in the image I acquired by the imaging device 11.

Figure 5:
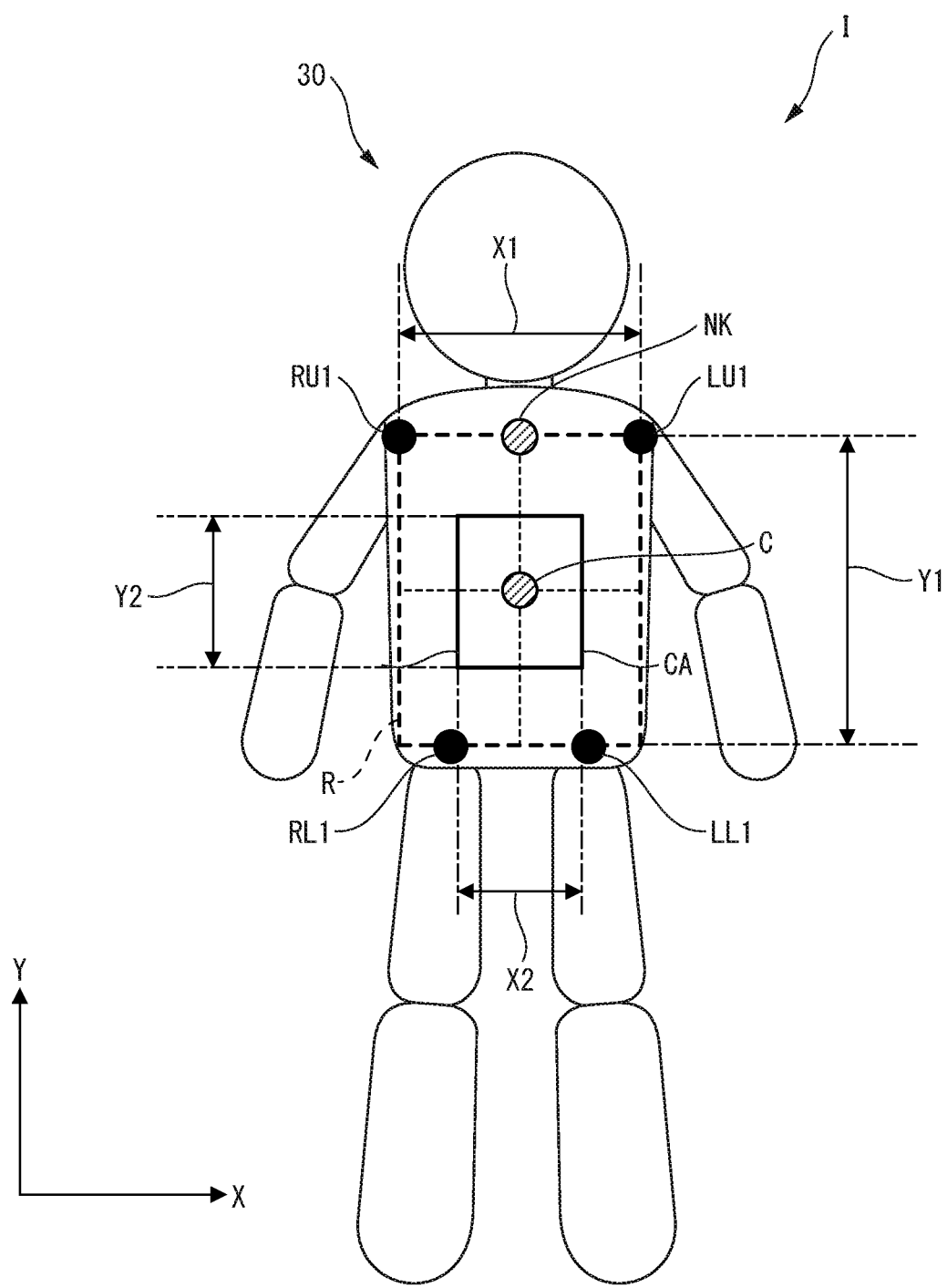
FIG. 5 illustrates an exemplary manner for determining a center of a human body and a center area in the skeleton model of FIG. 3.

As illustrated in FIG. 5, the position of the center feature point C of the model human body is determined based on the positions of the feature points corresponding to the limbs of the model human body. Specifically, the position of the center feature point C can be determined by the following procedure.

In a case where the left-right direction and the up-down direction in the image I acquired by the imaging device 11 are respectively defined as the X direction and the Y direction, it is defined a rectangle R formed by a short side having a dimension X1 and a long side having a dimension Y1. The dimension X1 corresponds to a distance along the X direction between the left shoulder feature point LU1 and the right shoulder feature point RU1. The dimension Y1 corresponds to a distance along the Y direction between the left shoulder feature point LU1 and the left hip feature point LL1 (or between the right shoulder feature point RU1 and the right hip feature point RL1). Subsequently, an intersection of a straight line extending in the Y direction through the midpoint of the short side of the rectangle R and a straight line extending in the X direction through the midpoint of the long side of the rectangle R is determined as the position of the center feature point C.

According to such a configuration, the position of the center feature point C can be determined based on the feature points corresponding to the limbs that are relatively easy to detect. In other words, in order to apply the skeleton model M capable of improving the discrimination accuracy as described above, it is not necessary to detect the position of the center feature point C as a feature point. Accordingly, it is possible to improve the discrimination accuracy of the subject 30 while suppressing an increase in the processing load of the image processing device 12.

It should be noted that the straight line extending in the Y direction used for determining the position of the center feature point C does not necessarily have to pass through the midpoint of the short side of the rectangle R. Similarly, the straight line extending in the X direction used for determining the position of the center feature point C does not necessarily have to pass through the midpoint of the long side of the rectangle R. The points at which these straight lines intersect the short side and the long side of the rectangle R can be appropriately changed.

The neck feature point NK may also be determined based on the positions of the feature points corresponding to the limbs. For example, the neck feature point NK may be determined as a midpoint of a straight line connecting the left shoulder feature point LU1 and the right shoulder feature point RU1. That is, when applying the skeleton model M, it is not necessary to detect the neck feature point NK. As a result, it is possible to suppress an increase in the processing load of the image processing device 12.

Figure 6:
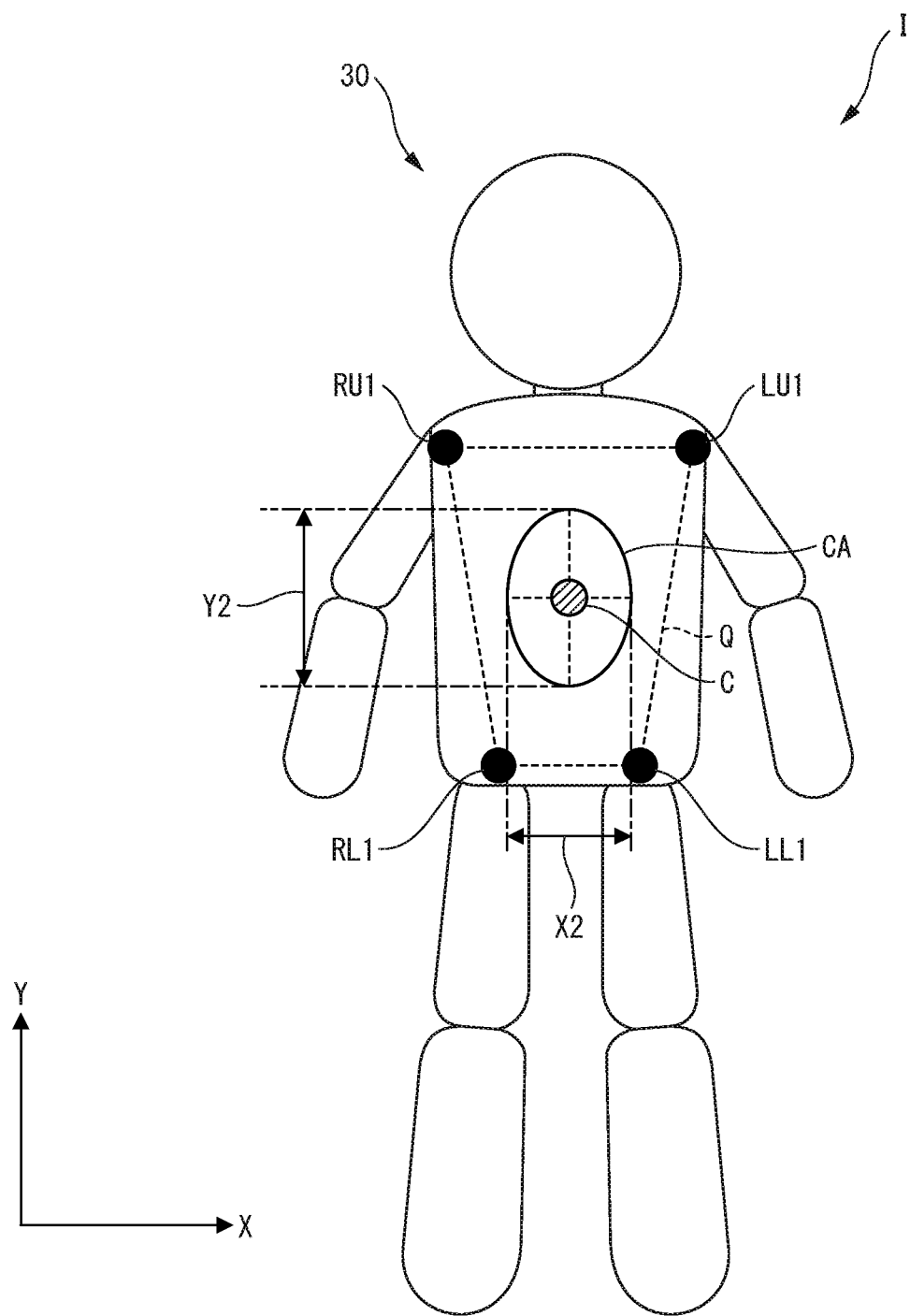
FIG. 6 illustrates an exemplary manner for determining a center of a human body and a center area in the skeleton model of FIG. 3.

As illustrated in FIG. 6, the center feature point C may be determined without using the rectangle R illustrated in FIG. 5. In this example, it is defined a quadrangle Q having vertices corresponding to the left shoulder feature point LU1, the right shoulder feature point RU1, the left hip feature point LL1, and the right hip feature point RL1. Subsequently, a centroid of the quadrangle Q is determined as the position of the center feature point C.

According to such a configuration, it is possible to alleviate the constraint relating to the posture of the subject 30 when the center feature point C is determined.

As illustrated in FIG. 5, the size of the center area CA of the model human body is determined based on the distance between the feature points corresponding to the limbs of the model human body. In this example, the center area CA has a rectangular shape. A dimension X2 of the short side of the center area CA is half the dimension X1 of the short side of the rectangle R. The dimension Y2 of the long side of the center area CA is half the dimension Y1 of the long side of the rectangle R.

It should be noted that the ratio of the dimension X2 to the dimension X1 and the ratio of the dimension Y2 to the dimension Y1 can be individually and appropriately determined.

The center feature point C determined as described above is located in the torso of a person as the subject 30 captured in the image I. The center area CA has an area reflecting the extent of the actual torso of the person as the subject 30. By the center area CA including the center feature point C in addition to the determination of the position of the center feature point C, it is possible to provide a skeleton model M that is descriptive of a human body with higher reality. Accordingly, it is possible to further improve the accuracy of discrimination of the subject 30 captured in the image I acquired by the imaging device 11.

For example, since the actual torso has an extent, depending on the posture of the person as the subject 30, there would be a hidden body part that is obstructed by the torso and is not captured in the image I. Based on the positional relationship between the detected feature point and the center area CA, it is possible to improve the estimation accuracy of such a hidden body part.

As illustrated in FIG. 6, the center area CA of the human body does not necessarily have to be rectangular. In this example, the center area CA has an elliptical shape. In this case, the dimension X2 along the X direction and the dimension Y2 along the Y direction of the elliptical shape can be appropriately determined based on the size of the previously determined quadrangle Q (or the rectangle R illustrated in FIG. 5).

The body part associated with the feature points included in the left upper limb group LU and the number of the feature points can be appropriately determined. The center feature point C and the feature point serving as a reference for defining the center area CA may be appropriately determined. However, it is preferable that the left upper limb group LU includes the left shoulder feature point LU1. This is because the left shoulder feature point LU1 is a feature point that can be detected with a relatively high stability regardless of the state of the left upper limb. For the same reason, it is preferable to use the left shoulder feature point LU1 as the reference for defining the center feature point C and the center area CA.

The body part associated with the feature points included in the right upper limb group RU and the number of the feature points can be appropriately determined. The center feature point C and the feature point serving as a reference for defining the center area CA may be appropriately determined. However, it is preferable that the right upper limb group RU includes the right shoulder feature point RU1. This is because the right shoulder feature point RU1 is a feature point that can be detected with a relatively high stability regardless of the state of the right upper limb. For the same reason, it is preferable to use the right shoulder feature point RU1 as a reference for defining the center feature point C and the center area CA.

The body part associated with the feature points included in the left lower limb group LL and the number of the feature points can be appropriately determined. The center feature point C and the feature point serving as a reference for defining the center area CA may be appropriately determined. However, it is preferable that the left lower limb group LL includes the left hip feature point LL1. This is because the left hip feature point LL1 is a feature point that can be detected with a relatively high stability regardless of the state of the left leg. For the same reason, it is preferable to use the left hip feature point LL1 as a reference for defining the center feature point C and the center area CA.

The body part associated with the feature points included in the right lower limb group RL and the number of the feature points can be appropriately determined. The center feature point C and the feature point serving as a reference for defining the center area CA may be appropriately determined. However, it is preferable that the right lower limb group RL includes the right hip feature point RL1. This is because the right hip feature point RL1 is a feature point that can be detected with a relatively high stability regardless of the state of the right leg. For the same reason, it is preferable to use the right hip feature point RL1 as a reference for defining the center feature point C and the center area CA.

Referring to FIGS. 7 to 10, exemplary processing for applying the skeleton model M to the subject 30 captured in the image I acquired by the imaging device 11 will be described.

Figure 7:
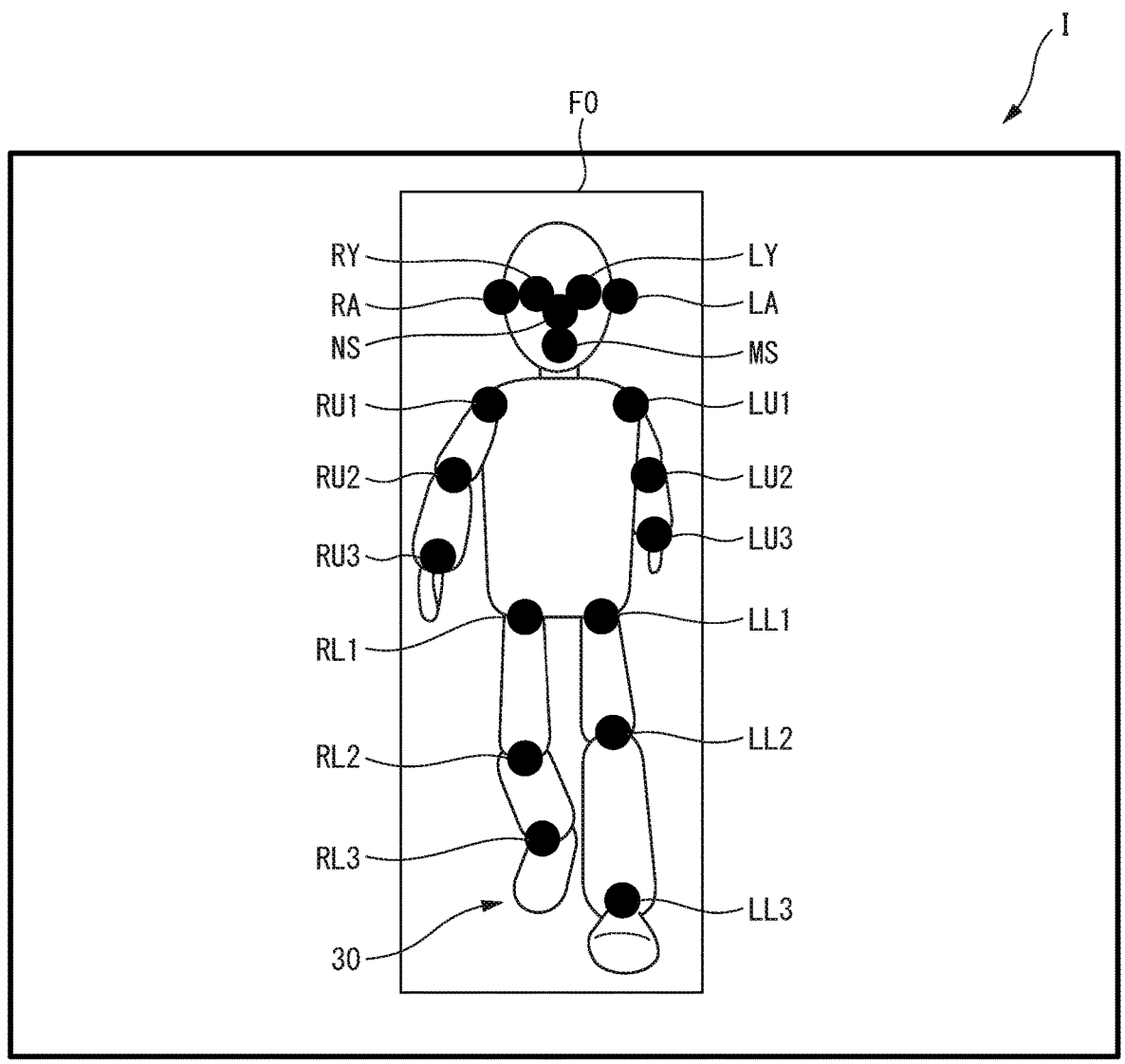
FIG. 7 illustrates a flow of processing for applying the skeleton model of FIG. 3 to a subject.

The processor 122 of the image processing device 12 executes processing for detecting an object having a high likelihood of being human captured in the image I based on the image data DI received by the reception interface 121. Since the processing can be appropriately performed using a well-known method, detailed explanations for the processing will be omitted. A frame F0 in FIG. 7 represents an area containing an object that is so identified in the image I as to have a high likelihood of being human.

Subsequently, the processor 122 detects a plurality of real feature points based on the assumption that the subject 30 is human. Since the processing for detecting a plurality of real feature points corresponding to a plurality of characteristic body parts from the subject 30 captured in the image I can be appropriately performed using a well-known technique, detailed explanations for the processing will be omitted.

In this example, in addition to the left shoulder feature point LU1, the left elbow feature point LU2, the left wrist feature point LU3, the right shoulder feature point RU1, the right elbow feature point RU2, the right wrist feature point RU3, the left hip feature point LL1, the left knee feature point LL2, the left ankle feature point LL3, the tight hip feature point RL1, the right knee feature point RL2, and the right ankle feature point RL3 described above, a left eye feature point LY, a right eye feature point RY, a nose feature point NS, a mouth feature point MS, a left ear feature point LA, and a right ear feature point RA are detected. The left eye feature point LY is a feature point corresponding to the left eye of the human body. The right eye feature point RY is a feature point corresponding to the right eye of the human body. The nose feature point NS is a feature point corresponding to the nose of the human body. The mouth feature point MS is a feature point corresponding to the mouth of the human body. The left ear feature point LA is a feature point corresponding to the left ear of the human body. The right ear feature point RA is a feature point corresponding to the right ear of the human body.

Figure 8:
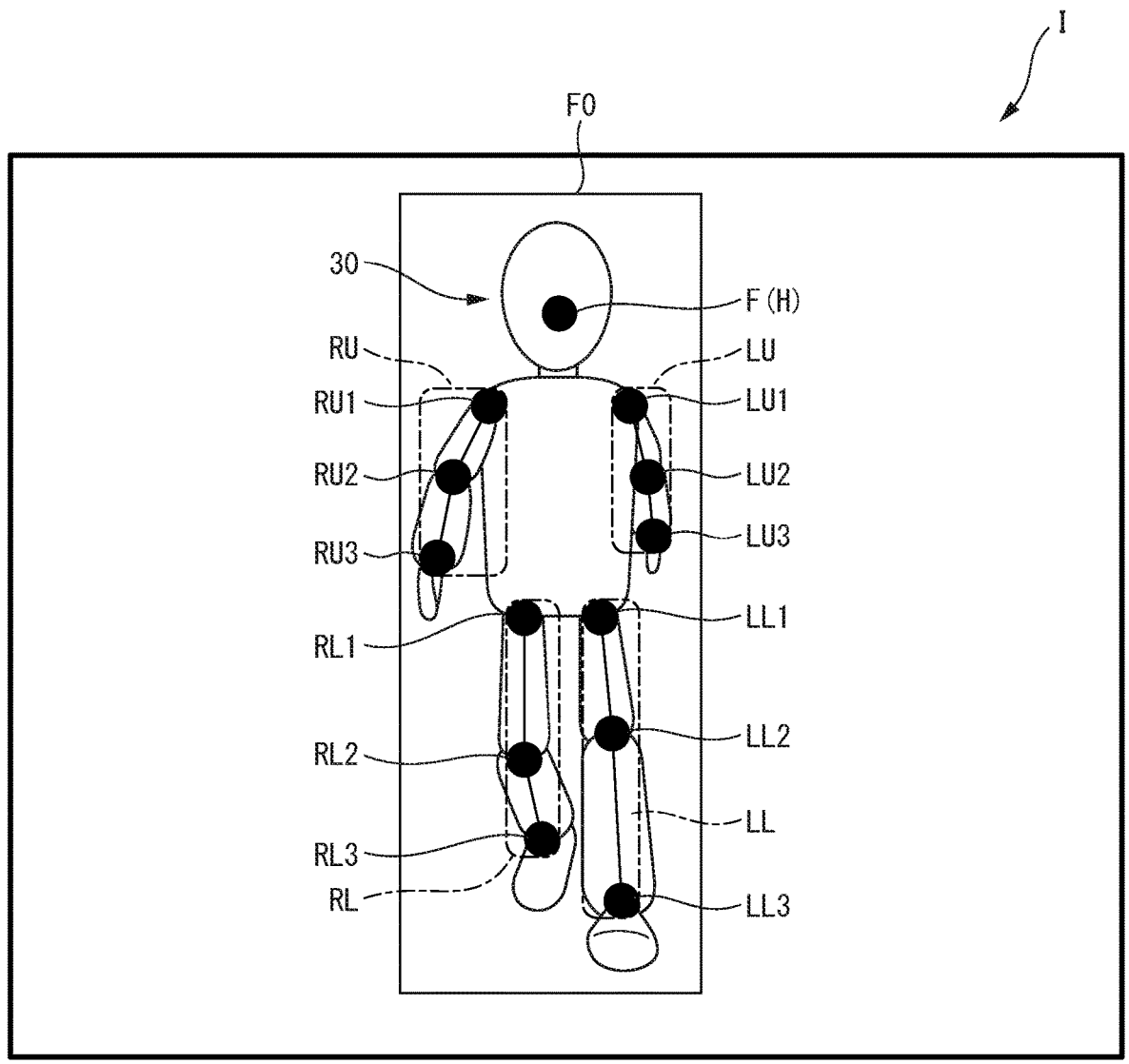
FIG. 8 illustrates a flow of processing for applying the skeleton model of FIG. 3 to a subject.

Subsequently, as illustrated in FIG. 8, the processor 122 classifies the detected real feature points into a plurality of groups defined in the skeleton model M. In other words, a plurality of groups are formed such that prescribed real feature points are included in each group.

In this example, the left upper limb group LU is formed so as to include the left shoulder feature point LU1, the left elbow feature point LU2, and the left wrist feature point LU3. The right upper limb group RU is formed so as to include the right shoulder feature point RU1, the right elbow feature point RU2, and the right wrist feature point RU3. The left lower limb group LL is formed so as to include the left hip feature point LL1, the left knee feature point LL2, and the left ankle feature point LL3. The right lower limb group RL is formed so as to include the right hip feature point RL1, the right knee feature point RL2, and the right ankle feature point RL3.

Moreover, the processor 122 performs processing for connecting the real feature points included in each group with a skeleton line.

In addition, the face feature point F is determined based on the left eye feature point LY, the right eye feature point RY, the nose feature point NS, the mouth feature point MS, the left ear feature point LA, and the right ear feature point RA. Additionally or alternatively, a head feature point H may be determined. The face feature point F may provide information relating to the position and direction of the face. The head feature point H may represent an estimated position of the center of the head. Since the processing for defining the face feature point F and the head feature point H based on the left eye feature point LY, the right eye feature point RY, the nose feature point NS, the mouth feature point MS, the left ear feature point LA, and the right-ear feature point RA of the human body can be appropriately performed using a well-known technique, detailed explanations for the processing will be omitted.

Figure 9:
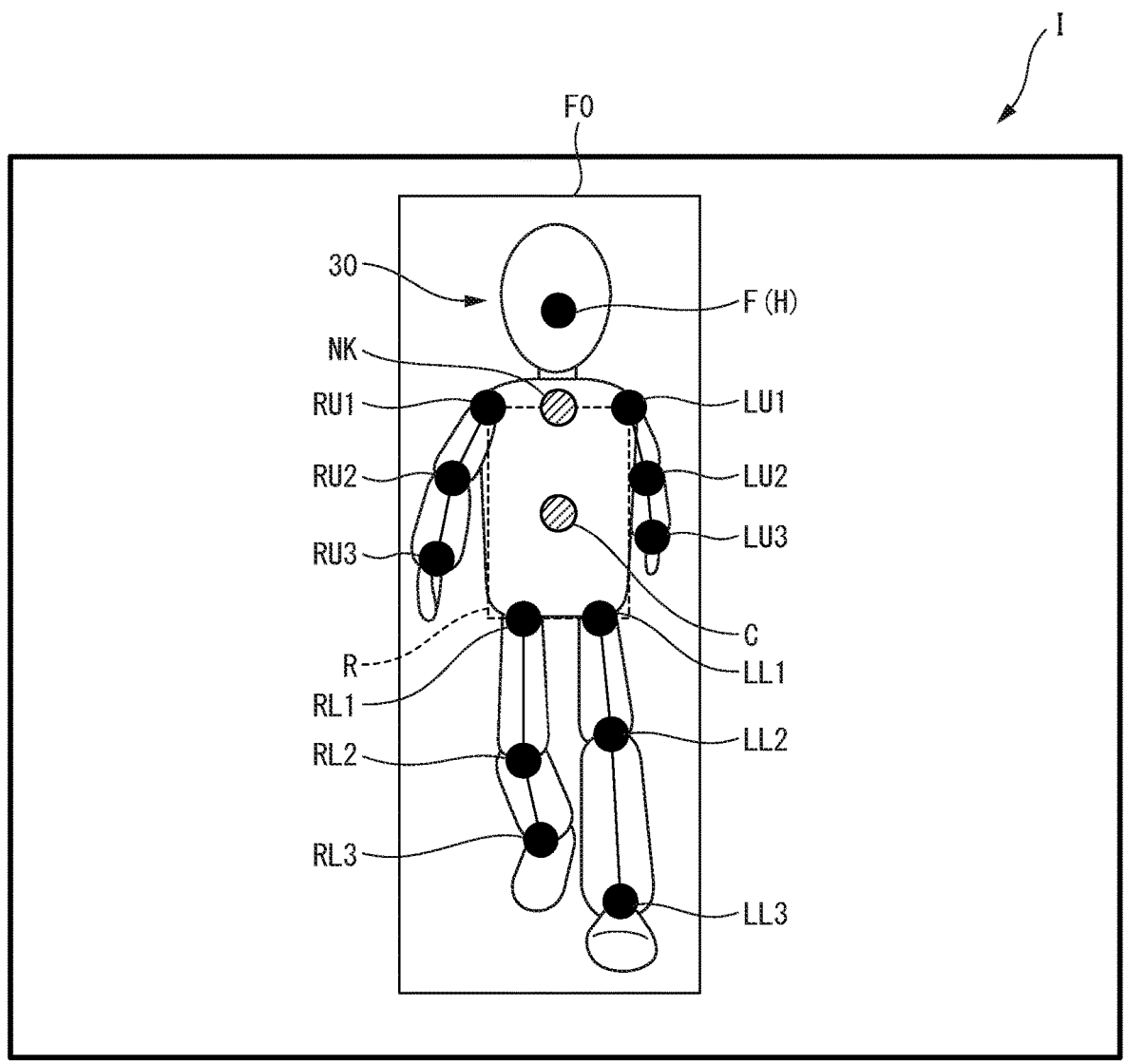
FIG. 9 illustrates a flow of processing for applying the skeleton model of FIG. 3 to a subject.

Next, as illustrated in FIG. 9, the processor 122 performs processing for defining the center feature point C. In this example, the rectangle R described with reference to FIG. 5 is used. In addition, the processor 122 performs processing for defining the neck feature point NK. In this example, the midpoint of the straight line connecting the left shoulder feature LU1 and the right shoulder feature point RU1 is determined as the neck feature point NK.

Figure 10:
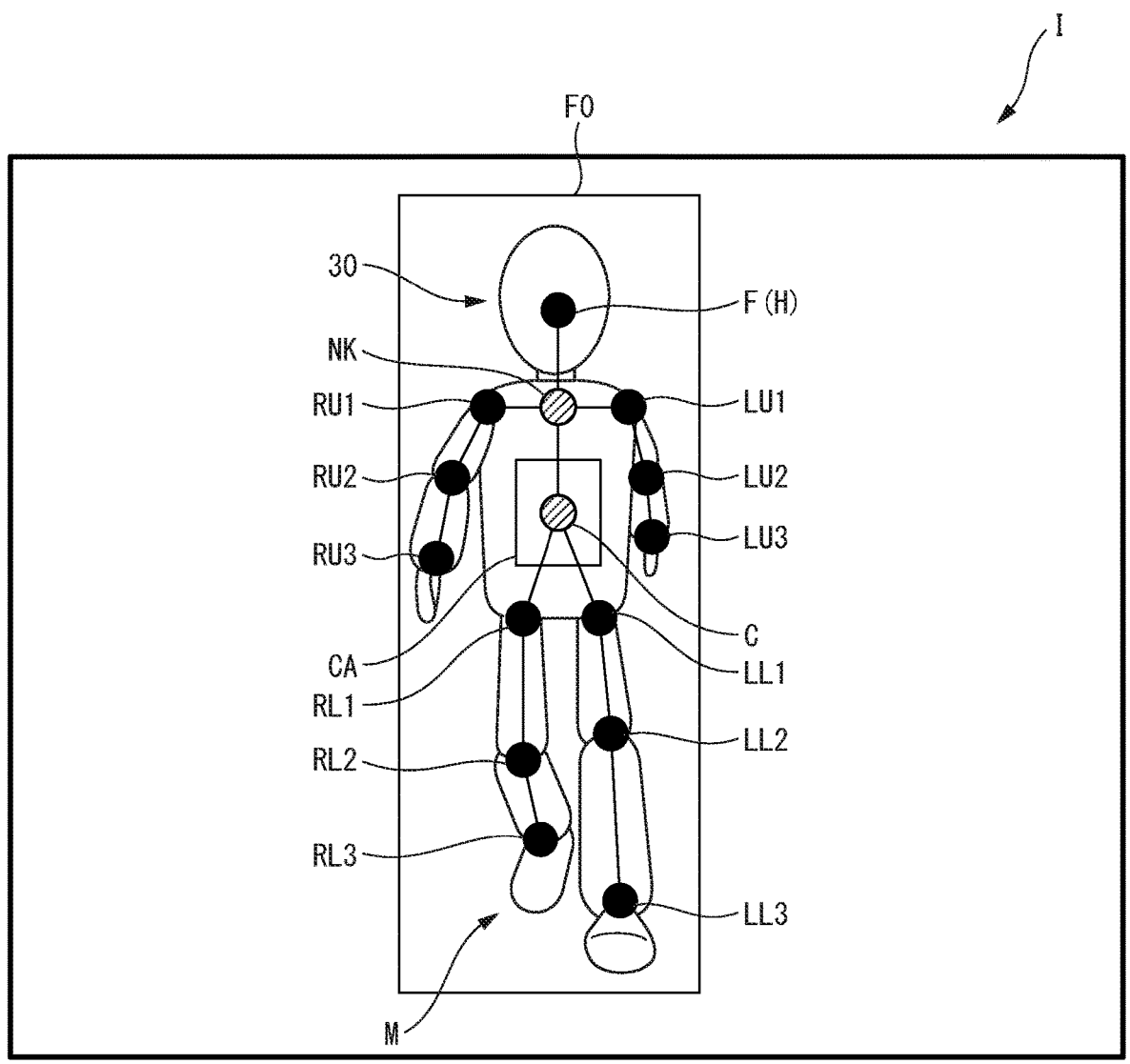
FIG. 10 illustrates a flow of processing for applying the skeleton model of FIG. 3 to a subject.

Next, as illustrated in FIG. 10, the processor 122 performs processing for defining the center area CA. In this example, the technique described with reference to FIG. 5 is used.

Subsequently, the processor 122 performs processing for connecting each of the groups corresponding to the center feature point C and the limbs with skeleton lines. Specifically, the left shoulder feature point LU1 and the right shoulder feature point RU1 are connected to the center feature point C via the neck feature point NK. Each of the left hip feature point LL1 and the right hip feature point RL1 is directly connected to the center feature point C. At least one of the face feature point F and the head feature point H is connected to the neck feature point NK.

In a case where it is impossible to detect a prescribed real feature point and/or to classify the detected real feature points into the groups, there happens to be a certain skeleton line that cannot connect the real feature points. In a case where a ratio of the number of skeleton line at cannot perform the connection to the total number of skeleton lines exceeds a threshold value, the processor 122 may determine that the skeleton model M does not match the subject 30. The threshold value for the ratio can be appropriately determined. That is, the processor 122 can determine whether the subject 30 is human based on whether the skeleton model M matches the real feature points.

According to such a configuration, it is possible to suppress a possibility that unnecessary processing based on the skeleton model lvi is performed on the subject 30 that is not human. Accordingly, it is possible to further improve the accuracy of discrimination of the subject 30 and suppress an increase in the processing load of the image processing device 12.

The person as the subject 30 to be captured in the image I acquired by the imaging device 11 is not always facing a front of the imaging device 11. The processor 122 of the image processing device 12 is configured to estimate the presence or absence of a twist in the body of the person captured in the image I based on the image data DI received by the reception interface 121.

Figure 11:
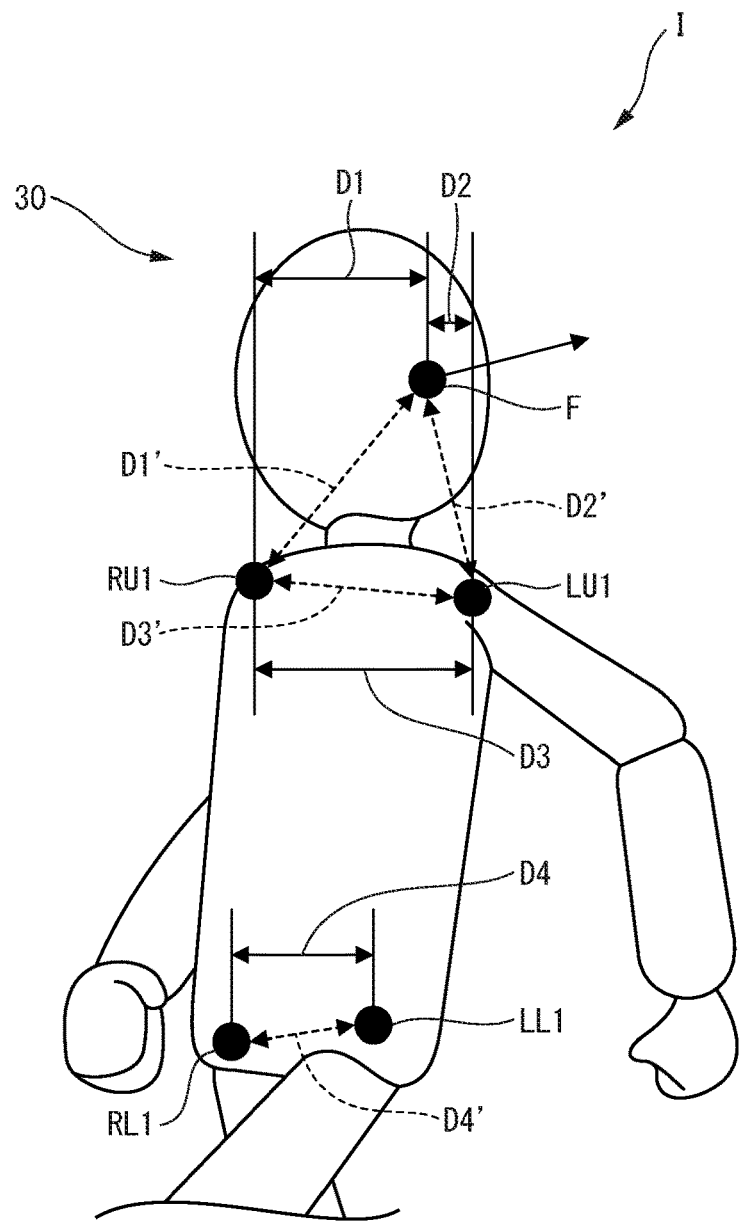
FIG. 11 is a diagram for explaining processing for estimating a hidden body part of a person as the subject.

Specifically, as illustrated in FIG. 11, the processor 122 acquires a distance D1 between the left shoulder feature point LU1 and the face feature point F along the X direction, and a distance D2 between the right shoulder feature point RU1 and the face feature point F along the X direction. The left shoulder feature point LU1 is an example of the first feature point. The right shoulder feature point RU1 is an example of the second feature point. The face feature point is an example of the third feature point. The distance D1 is an example of the first value. The distance D2 is an example of the second value.

Subsequently, the processor 122 estimates the presence or absence of the twist in the body of the person captured in the image I based on a ratio between the distance D1 and the distance D2. Specifically, when a difference between the ratio and 1 exceeds a threshold value, it is estimated that the body is twisted. When a person as the subject 30 faces the imaging device 11, it is highly probable that the left shoulder feature point LU1 and the right shoulder feature point RU1 are located symmetrically with respect to the face feature point F in the left-right direction (X direction). Accordingly, the ratio between the distance D1 and the distance D2 approaches 1. In other words, the smaller the ratio than 1, the higher the probability that the front of the face and the front of the upper body face in different directions.

Accordingly, with the processing as described above, it is possible to estimate the presence or absence of a twist between the face and the upper body of the person as the subject 30. As a result, it is possible to improve the discrimination accuracy of the subject 30 captured in the image I acquired by the imaging device 11.

As illustrated in FIG. 11, when estimating the presence or absence of a twist in the body, a distance D1' between the left shoulder feature point LU1 and the face feature point F, and a distance D2' between the right shoulder feature point RU1 and the face feature point F may be acquired, and the ratio of these values may be directly obtained. In this case, the distance D1' is an example of the first value, and the distance D2' is an example of the second value.

The feature points used to acquire the distance to the face feature point F are not limited to the left shoulder feature point LU1 and the right shoulder feature point RU1. As long as the point corresponds to a characteristic part included in the left upper limb of the person as the subject 30, an appropriate point can be employed as the first feature point. Similarly, as long as the point corresponds to a characteristic part included in the right upper limb of the person as the subject 30, an appropriate point can be employed as the second feature point. It should be noted that, like the left elbow feature point LU2 and the right elbow feature point RU2, it is necessary to select two points that are located symmetrically with respect to the face feature point F relative to the left-right direction when a person as the subject 30 faces the front of the imaging device 11.

However, since the positions of the left shoulder feature point LU1 and the right shoulder feature point RU1 are relatively stable regardless of the state of both upper limbs and are close to the face feature point F, it is advantageous to employ the left shoulder feature point LU1 and the right shoulder feature point RU1 as the first feature point and the second feature point in order to accurately estimate the presence or absence of twist in the face and the upper body.

As long as it corresponds to a characteristic part included in the face of the person as the subject 30, a feature point other than the face feature point F can be employed as the third feature point. It should be noted that, like the nose feature point NS and the mouth feature point MS, it is necessary to select a point that has a symmetric relationship with respect to the first feature point and the second feature point relative to the left-right direction when a person as the subject 30 faces the front of the imaging device 11.

Based on more or less of the ratio of the distance D1 and the distance D2 with respect to 1, the processor 122 can estimate a twist direction of the body of the person as the subject 30.

Specifically, as illustrated in FIG. 11, in a case where the ratio is more than 1 (in a case where D1 is more than D2), the processor 122 estimates that the face is twisted leftward relative to the upper body. In a case where the ratio is less than 1 (in a case where D2 is more than D1), the processor 122 estimates that the face is twisted rightward relative to the upper body.

According to such processing, not only the presence or absence of the twist of the body but also the direction of the twist can be estimated, so that the posture of the person as the subject 30 can be determined with higher accuracy.

As illustrated in FIG. 11, the processor 122 acquires a value corresponding to the width across the shoulders of the person as the subject 30. In this example, the distance D3 between the left shoulder feature point LU1 and the right shoulder feature point RU1 along the X direction is acquired as a value corresponding to the width across the shoulders. In addition, the processor 122 acquires a distance D4 between the left hip feature point LL1 and the right hip feature point RL1 along the X direction. The left hip feature point LL1 is an example of the first feature point. The right hip feature point RL1 is an example of the second feature point. The distance D3 is an example of the first value. The distance D4 is an example of the second value.

Subsequently, the processor 122 estimates the presence or absence of a twist in the body of the person captured in the image I based on the ratio of the distance D3 and the distance D4. Specifically, when the ratio of the distance D3 to the distance D4 does not fall within a prescribed threshold range, it is estimated that the body is twisted. For example, the threshold range is set as a value that is no less than 1 and no more than 2. In a case where a person as the subject 30 faces the front of the imaging device 11, the distance D3 corresponding to the width across the shoulders is more than the distance D4 corresponding to the width across the hips. Accordingly, the ratio of the distance D3 to the distance D4 falls within the above threshold range. On the other hand, in a case where the front of the upper body and the front of the lower body of the person as the subject 30 are oriented in different directions, the distance D3 corresponding to the width across the shoulders may be less than the distance D4 corresponding to the width across the hips. Otherwise, the distance D3 corresponding to the width across the shoulders may greatly exceed the distance D4 corresponding to the width across the hips. That is, when the ratio does not fall within the above threshold range, it is highly probable that the front of the upper body and the front of the lower body are oriented in different directions.

Accordingly, with the processing as described above, it is possible to estimate the presence or absence of a twist between the upper body and the lower body of the person as the subject 30. As a result, it is possible to improve the discrimination accuracy of the subject 30 captured in the image I acquired by the imaging device 11.

As illustrated in FIG. 11, when estimating the presence or absence of twist of the body, a distance D3' between the left shoulder feature point LU1 and the right shoulder feature point RU1 and a distance D4' between the left hip feature point LL1 and the tight hip feature point RL1 may be acquired, and the ratio of these values may be directly determined. In this case, the distance D3' is an example of the first value, and the distance D4' is an example of the second value.

The feature points used for comparison with the width across the shoulders are not limited to the left hip feature point LL1 and the right hip feature point RL1. As long as the point corresponds to a characteristic part included in the left lower limb of the person as the subject 30, an appropriate point can be employed as the first feature point. Similarly, as long as the point corresponds to a characteristic part included in the right lower limb of the person as the subject 30, an appropriate point can be employed as the second feature point. It should be noted that, like the left knee feature point LL2 and the tight knee feature point RL2, it is necessary to select two points that are located symmetrically with respect to a center axis of the body relative to the left-right direction when a person as the subject 30 faces the front of the imaging device 11.

However, since the positions of the left hip feature point LL1 and the right hip feature point RL1 are relatively stable regardless of the state of both lower limbs, it is advantageous to employ the left hip feature point LL1 and the right hip feature point RL1 as the first feature point and the second feature point in order to accurately estimate the presence or absence of twist in the upper body and the lower body.

As described above, the person as the subject 30 to be captured in the image I acquired by the imaging device 11 is not always facing the front of the imaging device 11. Depending on the posture of the person, there may be a hidden body part that is shielded by a portion of the person's body and does not appear in the image I. In an example illustrated in FIG. 12, the right upper limb and the left portion of the hips of the person as the subject 30 are not captured in the image I, so that the right shoulder feature point RU1, the right elbow feature point RU2, the right wrist feature point RU3, and the left hip feature point LL1 are not detected. It is also important to accurately recognize hidden body parts when estimating the posture of a person through the application of the skeletal model.

In recent years, a technique for detecting the feature points constituting the skeleton model using the deep learning or the like has been spreading. According to such technique, there would be a case where a feature point is detected as if it is a non-hidden body part that is captured in an image without being obstructed by another body part, even though it is actually a hidden body part that is not captured in the image due to obstruction by another body part. In the image I illustrated in FIG. 13, the right shoulder feature point RU1, the right elbow feature point RU2, the right wrist feature point RU3, and the left hip feature point LL1 in a person as the subject 30 are detected.

The processor 122 of the image processing device 12 is configured to estimate a hidden body part of the person captured in the image I based on the image data DI received by the reception interface 121.

Specifically, the processor 122 acquires a distance between a feature point included in a left limb and a feature point included in the right limb of a person as the subject 30. For example, a distance between the left shoulder feature point LU1 and the right shoulder feature point RU1 along the X direction is acquired. In a case where the distance is less than a threshold value, the processor 122 executes processing for estimating a hidden body part. The threshold value is determined as an appropriate value less than the distance between the left shoulder feature point LU1 and the right shoulder feature point RU1 when a person is facing the front of the imaging device 11. The left shoulder feature point LU1 is an example of the first feature point. The right shoulder feature point RU1 is an example of the second feature point.

In a case where the front of the torso of the person is oriented sideways with respect to the imaging device 11, a hidden body part tends to be appeared. At this time, the distance between the feature point included in the left limb and the feature point included in the right limb tends to be shorter than a case where the torso of the person faces the front of the imaging device 11. Accordingly, in a case where the distance between the left shoulder feature point LU1 and the right shoulder feature point RU1 along the X direction is less than the threshold value, it is highly probable that one of the left shoulder feature point LU1 and the right shoulder feature point RU1 is included in the hidden body part.

In a case where a feature point of a human body is detected by the deep learning or the like, it is common to assign data indicative of a likelihood to the feature point. The likelihood is an index indicative of the certainty of the detection. Since the likelihood can be appropriately obtained using a well-known technique, detailed explanations will be omitted.

When the distance between the left shoulder feature point LU1 and the right shoulder feature point RU1 along the X direction is less than the threshold value, the processor 122 compares the likelihood assigned to the left shoulder feature point LU1 and the likelihood assigned to the right shoulder feature point RU1, and estimates that the feature point assigned with the less likelihood is included in the hidden body part. In the example illustrated in FIG. 13, the likelihood assigned to the left shoulder feature point LU1 is 220, and the likelihood assigned to the right shoulder feature point RU1 is 205. Accordingly, the processor 122 estimates that the right shoulder feature point RU1 is included in the hidden body part.

Additionally or alternatively, a distance between another feature point included in the left upper limb and another feature point included in the right upper limb may be acquired. It should be noted that it is acquired a distance between feature points that are located symmetrically with respect to a center axis of the body relative to the left-right direction when a person faces the front of the imaging device 11. For example, at least one of the distance between the left elbow feature point LU2 and the right elbow feature point RU2 and the distance between the left wrist feature point LU3 and the right wrist feature point RU3 is acquired. Each of the left elbow feature point LU2 and the left wrist feature point LU3 is an example of the first feature point. Each of the right elbow feature point RU2 and the right wrist feature point RU3 is an example of the second feature point.

Figure 13:
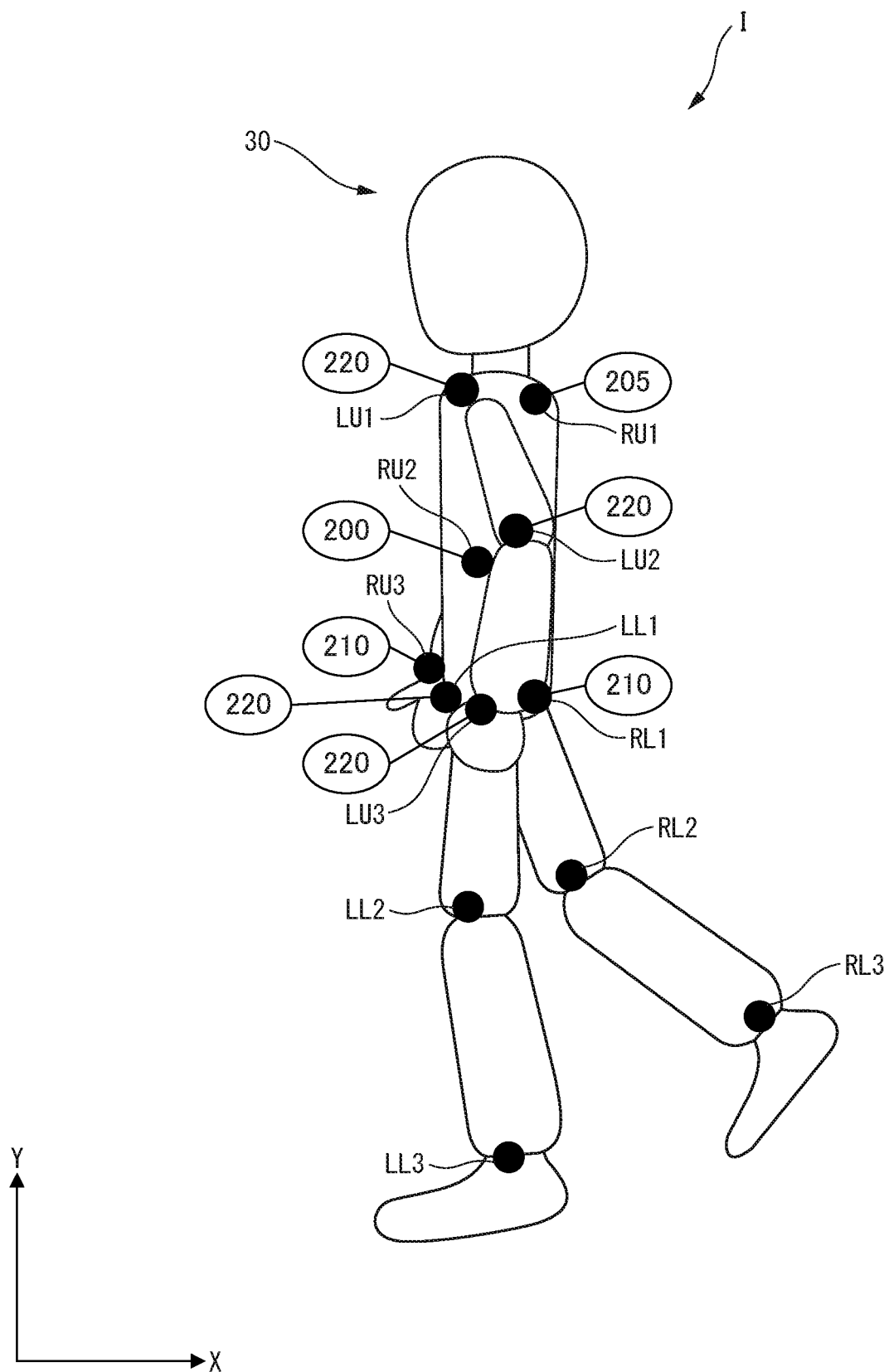
FIG. 13 is a diagram for explaining processing for estimating a hidden body part of a person as the subject.

In the example illustrated in FIG. 13, the likelihood assigned to the left elbow feature point LU2 is 220, and the likelihood assigned to the right elbow feature point RU2 is 200. Accordingly, the processor 122 estimates that the right elbow feature point RU2 is included in the hidden body part. Similarly, the likelihood assigned to the left wrist feature point LU3 is 220, and the likelihood assigned to the right wrist feature point RU3 is 210. Accordingly, the processor 122 estimates that the right wrist feature point RU3 is included in the hidden body part.

In a case where it is estimated that one of the feature points belonging to the same group is included in the hidden body part, the processor 122 may estimate that another feature point belonging to the same group is also included in the hidden body part. For example, in a case where it is estimated that the right shoulder feature point RU1 among the right shoulder feature point RU1, the right elbow feature point RU2, and the right wrist feature point RU3 belonging to the right upper limb group RU is included in the hidden body part, the processor 122 may estimate that the right elbow feature point RU2 and the right wrist feature point RU3 are also included in the hidden body part. In this case, it is preferable that the left shoulder feature point LU1 and the right shoulder feature point RU1 be used as references. This is because the distance between these feature points reflects the direction of the front of the torso with a relatively high stability regardless of the state of the upper limbs.

Figure 14:
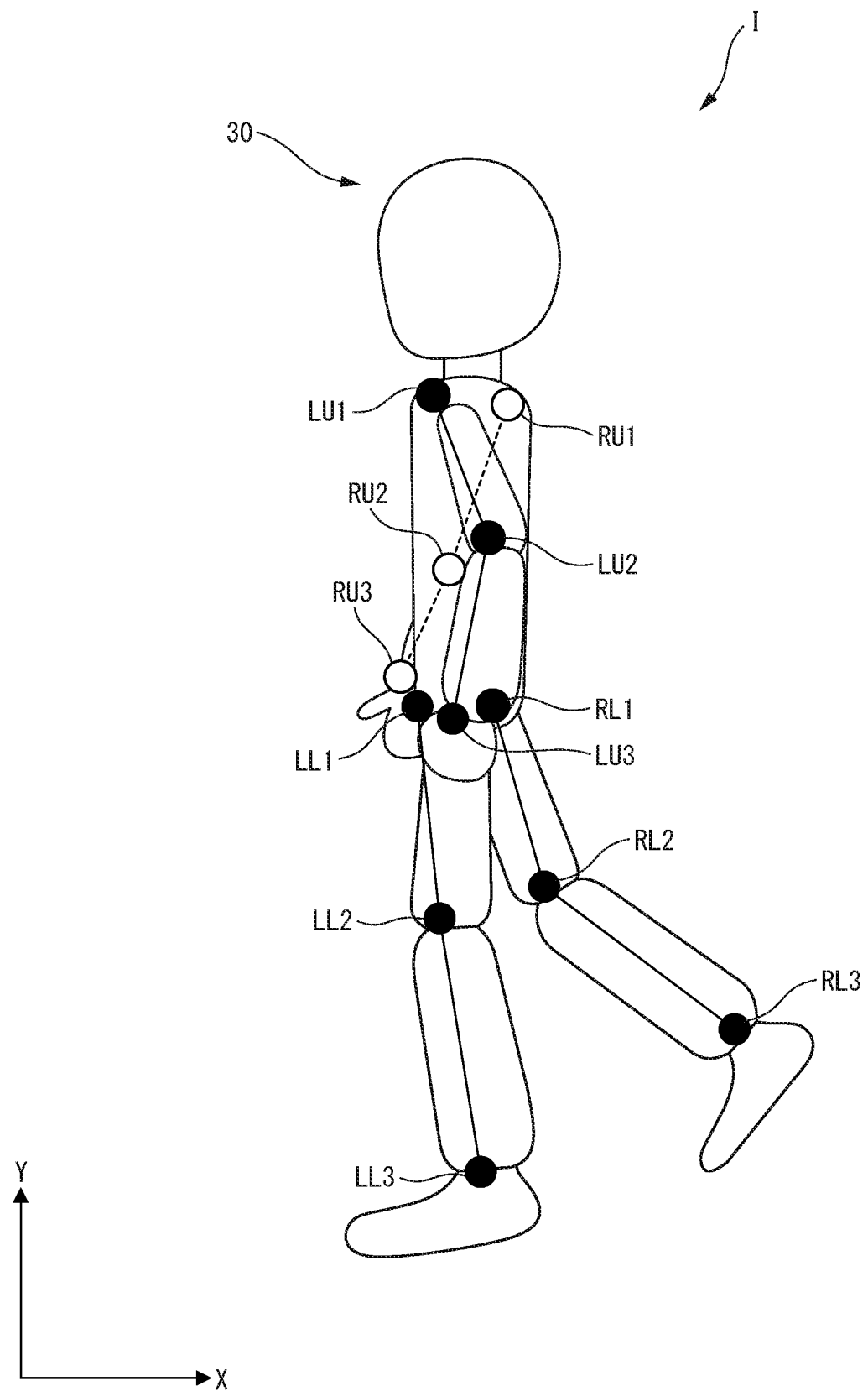
FIG. 14 is a diagram for explaining processing for estimating a hidden body part of a person as the subject.

The above estimation result is reflected as illustrated in FIG. 14. In this example, the feature points estimated to be included in the hidden body part are represented by white circles. Thereafter, the processor 122 performs processing for connecting the feature points with the skeleton lines. The skeleton lines includes a hidden skeleton line corresponding to the hidden body part and a non-hidden skeleton line corresponding to the non-hidden body part. In FIG. 14, the hidden skeleton lines are indicated by dashed lines, and the non-hidden skeleton lines are indicated by solid lines. In a case where at least one of two feature points connected by a skeleton line is included in a hidden body part, the processor 122 connects the two feature points with the hidden skeleton line. In other words, only in a case where both of two feature points connected by a skeleton line are included in a non-hidden body part, the two feature points are connected by the non-hidden skeleton line.

In the example illustrated in FIG. 14, the right shoulder feature point RU1 and the right elbow feature point RU2, both of which are estimated to correspond to the hidden body part, are connected by the hidden skeleton line. In this case, it is estimated that the right upper arm is a hidden body part. Similarly, the right elbow feature point RU2 and the right wrist feature point RU3 both of which are estimated to correspond to the hidden body part are connected by the hidden skeleton line. In this case, it is estimated that the right lower arm is a hidden body part.

Accordingly, with the processing as described above, it is possible to estimate a hidden body part that would appear in accordance with the posture of the person as the subject 30. As a result, it is possible to improve the discrimination accuracy of the subject 30 captured in the image I acquired by the imaging device 11.

The above descriptions with reference to FIGS. 13 and 14 can be similarly applied to the left hip feature point LL1, the left knee feature point LL2, and the left ankle feature point LL3 belonging to the left lower limb group LL, as well as the right hip feature point RL1, the right knee feature point RL2, and the right ankle feature point RL3 belonging to the right lower limb group RL. That is, each of the left hip feature point LL1, the left knee feature point LL2, and the left ankle feature point LL3 may be an example of the first feature point. Similarly, each of the right hip feature point RL1, the right knee feature point RL2, and the right ankle feature point RL3 may be an example of the second feature point.

Figure 15:
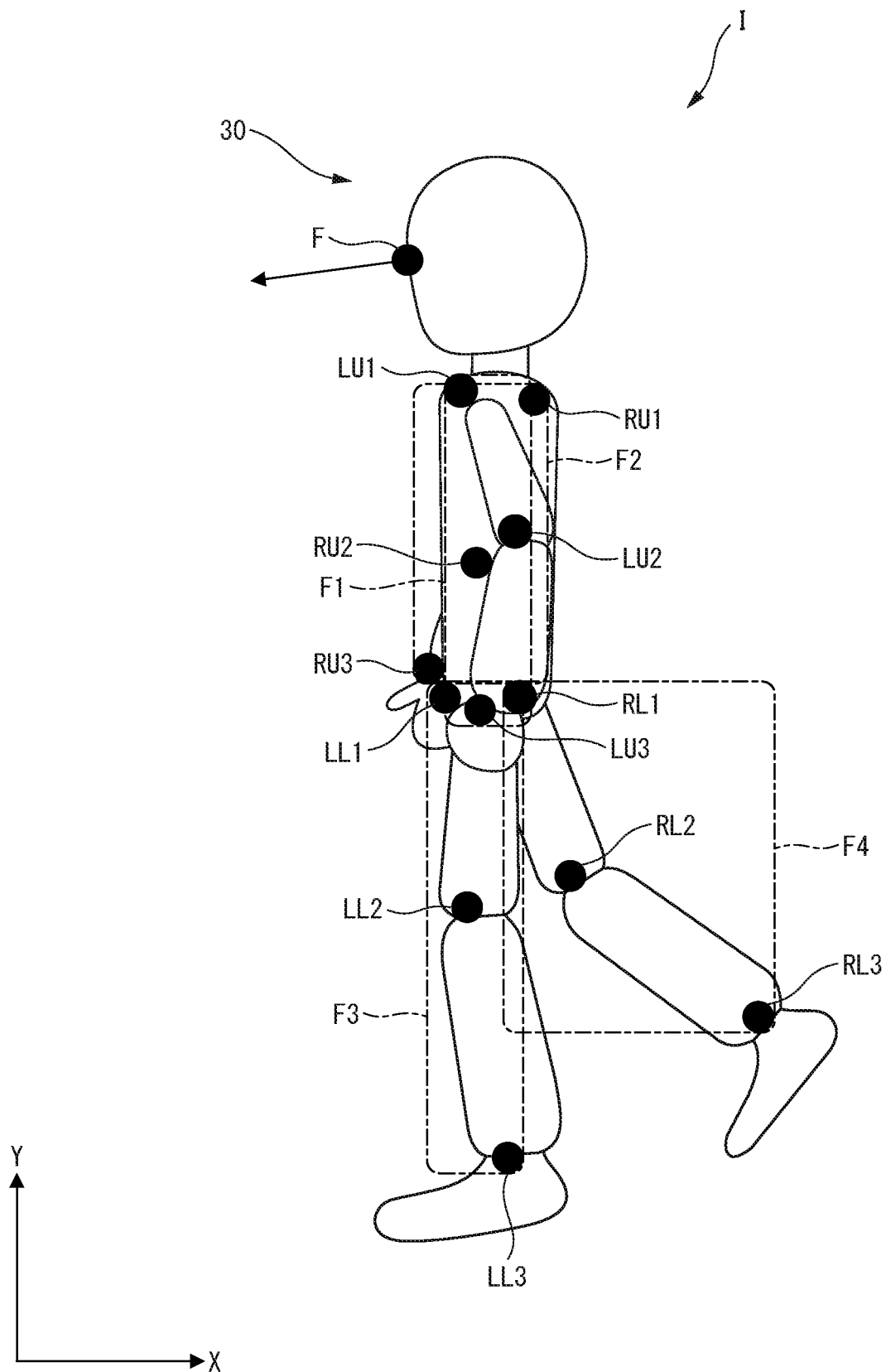
FIG. 15 is a diagram for explaining processing for estimating a hidden body part of a person as the subject.

FIG. 15 illustrates another exemplary processing that can be performed by the processor 122 in order to estimate a hidden body part of a person captured in the image I.

In this example, the processor 122 estimates the direction of the face of a person as the subject 30. The estimation may be performed based on the position of the face feature point F, for example.

In addition, the processor 122 generates a frame F1 corresponding to the left upper limb group LU and a frame F2 corresponding to the right upper limb group RU. The frame F1 is generated so as to include the left shoulder feature point LU1, the left elbow feature point LU2, and the left wrist feature point LU3. The frame F1 is an example of the first area. The frame is generated so as to include the right shoulder feature point RU1, the right elbow feature point RU2, and the right wrist feature point RU3. The frame F2 is an example of the second area.

For example, the top edge of the frame F1 is defined so as to overlap with a feature point located at the uppermost position among the feature points included in the left upper limb group LU. The bottom edge of the frame F1 is defined so as to overlap with a feature point located at the lowermost position among the feature points included in the left upper limb group LU. The left edge of the frame F1 is defined so as to overlap a feature point located at the leftmost position among the feature points included in the left upper limb group LU. The right edge of the frame F1 is defined so as to overlap with a feature point located at the rightmost position among the feature points included in the left upper limb group LU.

Similarly, the top edge of the frame F2 is defined so as to overlap with the feature point located at the uppermost position among the feature points included in the right upper limb group RU. The bottom edge of the frame F2 is defined so as to overlap with a feature point located at the lowermost position among the feature points included in the right upper limb group RU. The left edge of the frame F2 is defined so as to overlap with a feature point located at the leftmost position among the feature points included in the right upper limb group RU. The right edge of the frame F2 is defined so as to overlap with a feature point located at the rightmost position among the feature points included in the right upper limb group RU.

Subsequently, the processor 122 acquires an overlapping degree between the frame F1 and the frame F2. For example, the overlapping degree can be calculated as a ratio of an area of the portion where the frame F1 and the frame F2 overlap to an area of the less one of the frame F1 and the frame F2. In a case where the overlapping degree is more than a threshold value, the processor 122 executes processing for estimating a hidden body part.

In a case where the front of the torso of the person is oriented sideways with respect to the imaging device 11, a hidden body part tends to be appeared. At this time, the distance between the feature point included in the left limb and the feature point included in the right limb tends to be shorter than a case where the torso of the person faces the front of the imaging device 11. As a feature point included in the left limb and a feature point included in the right limb approach each other, the frame F1 and the frame F2 tend to overlap each other. Accordingly, in a case where the overlapping ratio between the frame F1 and the frame F2 is more than the threshold value, it is highly probable that one of the left upper limb group LU corresponding to the frame F1 and the right upper limb group RU corresponding to the frame F2 corresponds to the hidden body part.

In a case where the overlapping ratio of the frame F1 and the frame F2 is more than the threshold value, the processor 122 refers to the previously estimated direction of the face to estimate which of the left upper limb group LU and the right upper limb group RU corresponds to the hidden body part.

Specifically, in a case where it is estimated that the face directs leftward as illustrated in FIG. 15, the processor 122 estimates that the right upper limb group RU corresponds to the hidden body part. As a result, as illustrated in FIG. 14, it is estimated that the right shoulder feature point RU1, the right elbow feature point RU2, and the right wrist feature point RU3 included in the right upper limb group RU are included in the hidden body part, so that these feature points are connected by the hidden skeleton lines. In a case where it is estimated that the face directs rightward, the processor 122 estimates that the left upper limb group LU corresponds to the hidden body part.

The direction of the face of a person is highly related to the direction in which the front of the torso of the person directs. Accordingly, with the processing as described above, it is possible to improve the estimation accuracy of the hidden body part that would appear in accordance with the posture of the person as the subject 30. In this case, it is not essential to refer to the likelihood assigned to each feature point.

The above-described processing relating to the estimation of the hidden body part does not necessarily have to be based on the overlapping degree between the frame F1 and the frame F2. For example, the hidden body part may be estimated with reference to the direction of the face in a case where a distance between a representative point in the frame F1 and a representative point in the frame F2 is less than a threshold value. For example, a midpoint along the X direction of the frame F1 and a midpoint along the X direction of the frame F2 can be employed as the representative points. The distance between the representative point in the frame F1 and the representative point in the frame F2 may be an example of the distance between the first feature point and the second feature point.

The above description with reference to FIG. 15 can be similarly applied to the left hip feature point LL1, the left knee feature point LL2, and the left ankle feature point LL3 belonging to the left lower limb group LL, as well as the tight hip feature point RL1, the right knee feature point RL2, and the right ankle feature point RL3 belonging to the right lower limb group RL.

That is, the processor 122 generates a frame F3 corresponding to the left lower limb group LL and a frame F4 corresponding to the right lower limb group RL. The frame F3 is generated so as to include the left hip feature point LL1, the left knee feature point LL2, and the left ankle feature point LL3. The frame F3 is an example of the first area. The frame F4 is generated so as to include the right hip feature point RL1, the right knee feature point RL2, and the right ankle feature point RL3. The frame F4 is an example of the second area.

For example, the top edge of the frame F3 is defined so as to overlap with a feature point located at the uppermost position among the feature points included in the left lower limb group LL. The bottom edge of the frame F3 is defined so as to overlap with a feature point located at the lowermost position among the feature points included in the left lower limb group LL. The left edge of the frame F3 is defined so as to overlap with a feature point located at the leftmost position among the feature points included in the left lower limb group LL. The right edge of the frame F3 is defined so as to overlap with a feature point located at the rightmost position among the feature points included in the left lower limb group LL.

Similarly, the top edge of the frame F4 is defined so as to overlap with the a feature point located at the uppermost position among the feature points included in the right lower limb group RL. The bottom edge of the frame F4 is defined so as to overlap with a feature point located at the lowermost position among the feature points included in the right lower limb group RL. The left edge of the frame F4 is defined so as to overlap with a feature point located at the leftmost position among the feature points included in the right lower limb group RL. The right edge of the frame F4 is defined so as to overlap with a feature point located at the rightmost position among the feature points included in the right lower limb group RL.

Subsequently, the processor 122 acquires an overlapping degree between the frame F3 and the frame F4. For example, the overlapping degree can be calculated as a ratio of an area of the portion where the frame F3 and the frame F4 overlap to an area of the less one of the frame F3 and the frame F4. In a case where the overlapping degree is more than a threshold value, the processor 122 executes processing for estimating a hidden body part.

In a case where the overlapping ratio of the frame F3 and the frame F4 is more than the threshold value, the processor 122 refers to the previously estimated direction of the face to estimate which of the left lower limb group LL and the right lower limb group RL corresponds to the hidden body part.

Specifically, in a case where it is estimated that the face directs leftward, the processor 122 estimates that the right lower limb group RL corresponds to the hidden body part. In a case where it is estimated that the face directs rightward, the processor 122 estimates that the left lower limb group LL corresponds to the hidden body part.

The above-described processing relating to the estimation of the hidden body part does not necessarily have to be based on the overlapping degree between the frame F3 and the frame F4. For example, the hidden body part may be estimated with reference to the direction of the face in a case where a distance between a representative point in the frame F3 and a representative point in the frame F4 is less than a threshold value. For example, a midpoint along the X direction of the frame F3 and a midpoint along the X direction of the frame F4 can be employed as the representative points. The distance between the representative point in the frame F3 and the representative point in the frame F4 may be an example of the distance between the first feature point and the second feature point.

The processor 122 may perform both the processing described with reference to FIG. 13 and the processing described with reference to FIG. 15, and compare the estimation results obtained by both processing. In a case where the two results are different from each other, the processor 122 employs an estimation result obtained by processing based on the direction of the face.

Figure 12:
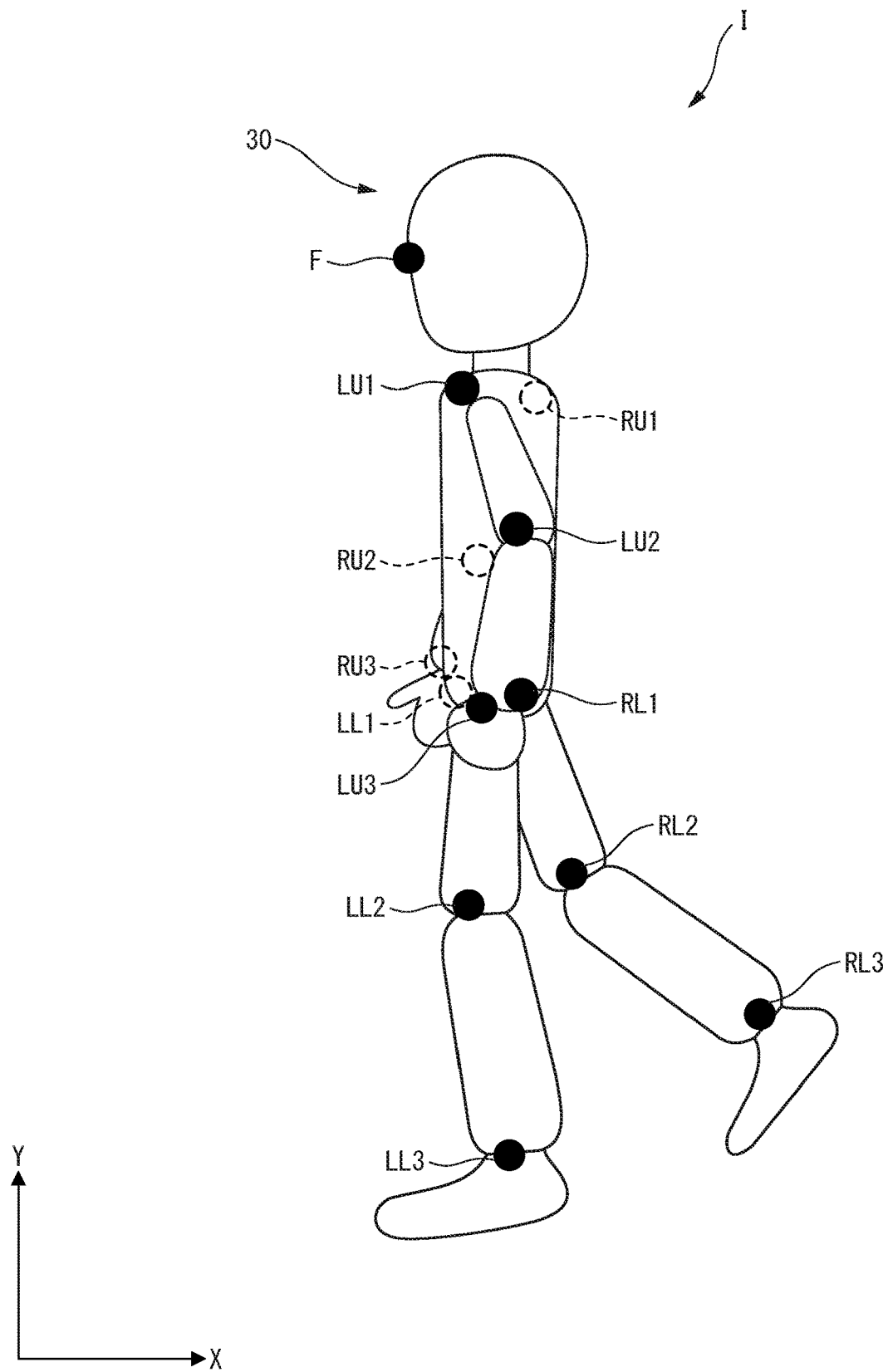
FIG. 12 is a diagram for explaining processing for estimating a hidden body part of a person as the subject.

For example, in the example illustrated in FIG. 12, the right hip feature point RL1 is not detected. In this case, in the processing illustrated in FIG. 13, the distance between the left hip feature point LL1 and the right hip feature point RL1 is less than the threshold value, so that it is estimated that the right hip feature point RL1 to which a lower likelihood is assigned corresponds to the hidden body part.

On the other hand, in the processing illustrated in FIG. 15, the frame F3 corresponding to the left lower limb group LL and the frame F4 corresponding to the right lower limb group RL have a low overlapping degree. Accordingly, the right hip feature point RL1, the right knee feature point RL2, and the right ankle feature point RL3 included in the right lower limb group RL are estimated as non-hidden body parts, and are connected by the non-hidden skeleton lines, as illustrated in FIG. 14. In this case, it is estimated that the right hip feature point RL1 corresponds to the non-hidden body part.

In other words, in a case where the estimation result obtained by the processing relying on the face direction and the estimation result obtained by the processing without relying on the face direction are different from each other, the former is employed. Accordingly, in the illustrated case, it is estimated that the right hip feature point RL1 is a hidden body part.

According to such a configuration, since it is prioritized the estimation result obtained by the processing relying on the direction of the face having a relatively high relevance to the direction of the torso of the person, it is possible to improve the estimation accuracy of the hidden body part.

Figure 16:
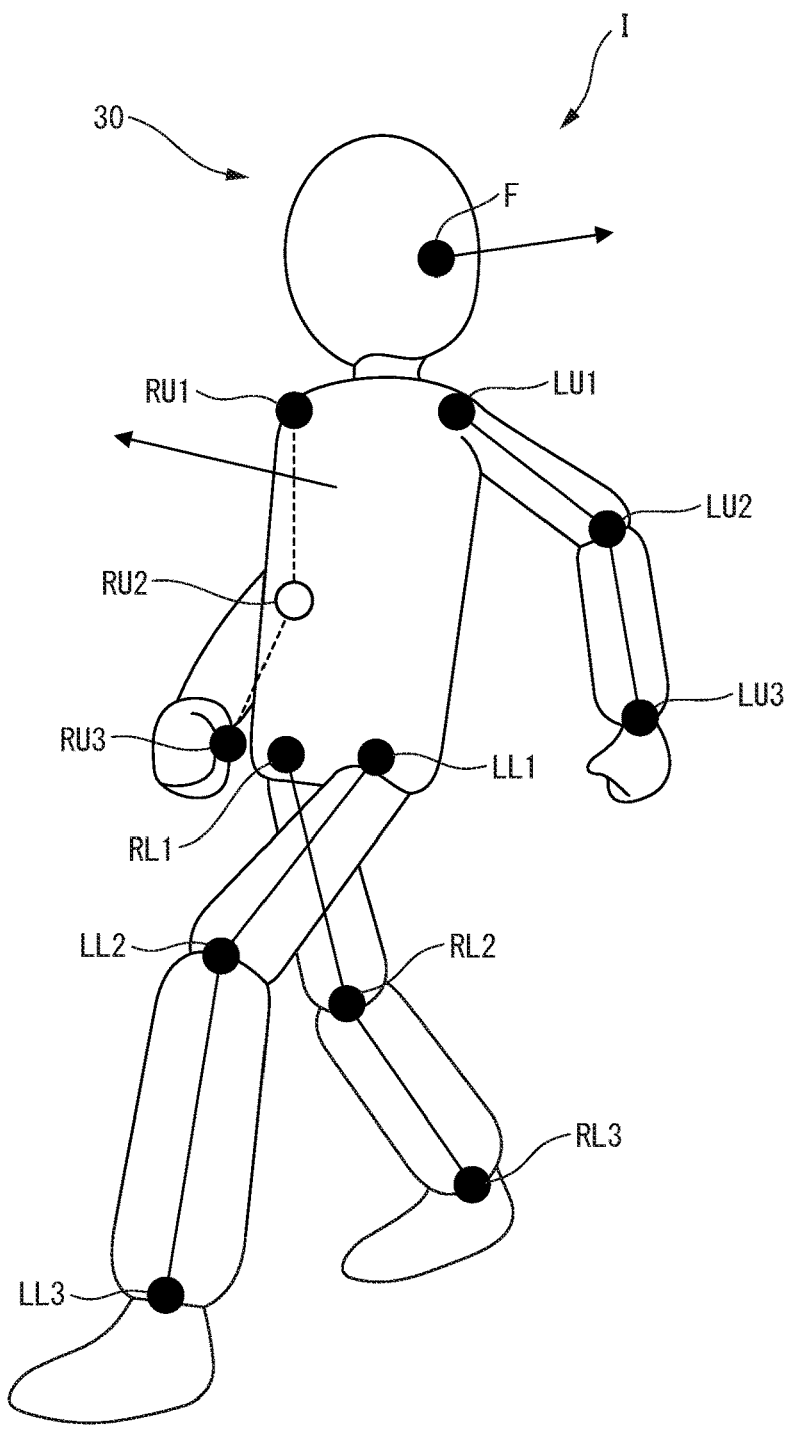
FIG. 16 is a diagram for explaining processing for estimating a hidden body part of a person as the subject.

The processing for estimating the twist direction of the body described with reference to FIG. 11 can be used for estimating a hidden body part. As illustrated in FIG. 16, in a case where the body is twisted such that the direction in which the front of the face directs and the direction in which the front of the torso directs are different with a relatively large extent, a hidden body part tends to be appeared.

Based on the processing described with reference to FIG. 11, it is estimated that the face is twisted leftward relative to the upper body in the example illustrated in FIG. 16. In this case, the processor 122 estimates that the upper limb in the direction opposite to the twist direction corresponds to the hidden body part. In this example, it is estimated that the right upper limb of the person as the subject 30 corresponds to the hidden body part.

In a case where a person as the subject 30 takes the posture illustrated in FIG. 16, there would be a case where a hidden body part cannot be correctly estimated by the processing described with reference to FIG. 13 or the processing described with reference to FIG. 15. This is because the direction of the front of the torso is relatively close to the front of the imaging device 11, so that the distance between the feature point included in the left upper limb and the feature point included in the right upper limb becomes relatively large. According to the processing as described above, a hidden body part that would be appeared by a twist of the body can also be added to an item to be estimated.

Figure 17:
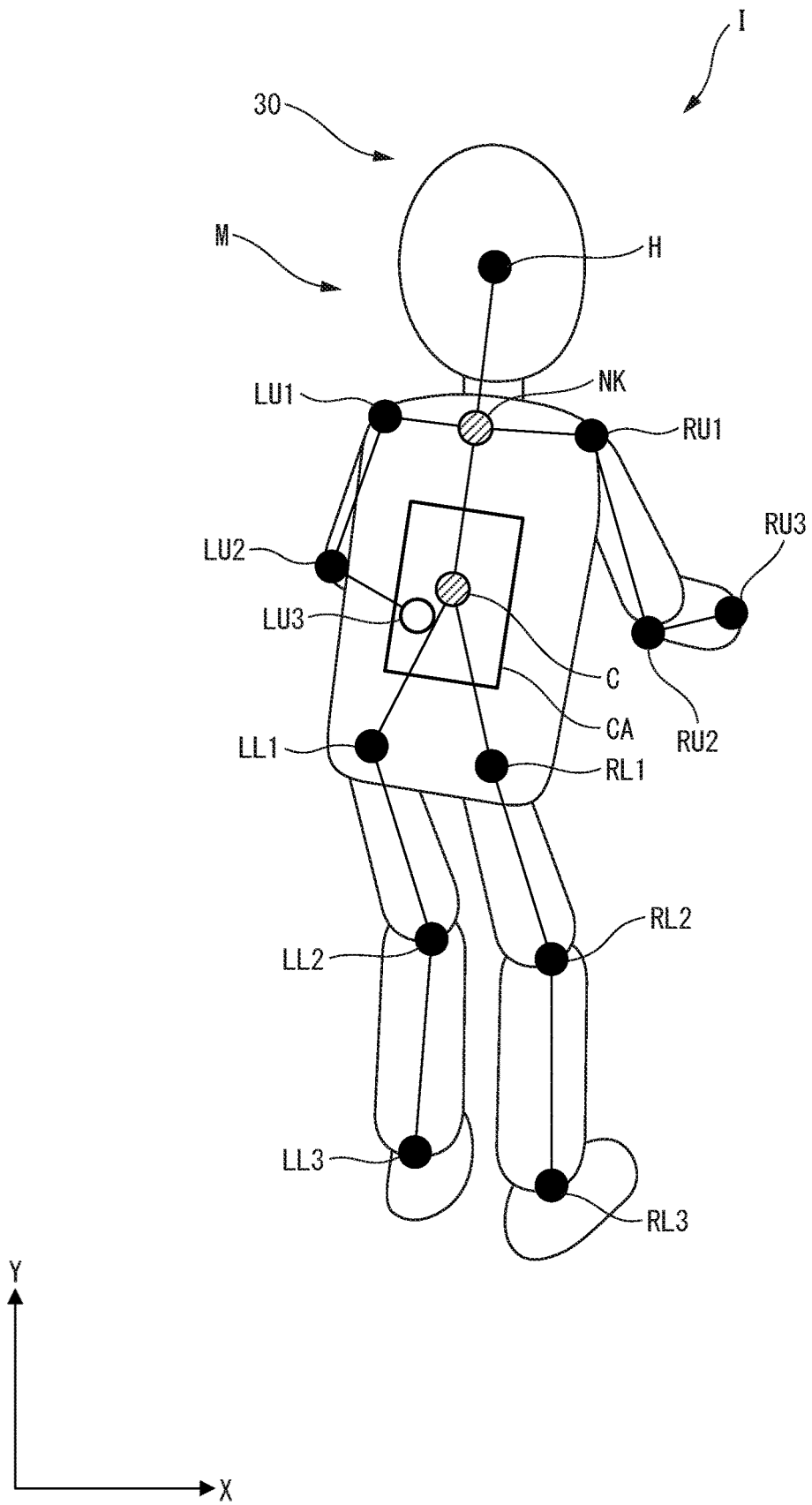
FIG. 17 is a diagram for explaining processing for estimating a hidden body part of a person as the subject.

In a case where a person as the subject 30 takes a posture illustrated in FIG. 17, that is, in a case where the back of the person faces the front of the imaging device 11, there is a possibility that the upper limbs are partially obstructed by the torso, so that a hidden body part is appeared. Also in this case, since the distance between the feature point included in the left upper limb and the feature point included in the right upper limb is relatively large and the body is not twisted, there would be a case where the hidden body part cannot be correctly estimated in any of the processing described with reference to FIGS. 13 to 16.

In a case where it is estimated that the back of the person as the subject 30 faces the front of the imaging device 11, the processor 122 of the image processing device 12 determines whether at least one of the left elbow feature point LU2 and the left wrist feature point LU3 is located in the center area CA of the skeleton model M described with reference to FIG. 3. Similarly, the processor 122 determines whether at least one of the right elbow feature point RU2 and the right wrist feature point RU3 is located in the center area CA. The processor 122 estimates that the feature point determined to be located in the center area. CA is included in the hidden body part.

In the example illustrated in FIG. 17, the left wrist feature point LU3 is located in the center area CA. Accordingly, it is estimated that the left wrist feature point LU3 corresponds to the hidden body part. Based on the above-described connection rule, a hidden skeleton line is used as the skeleton line connecting the left wrist feature point LU3 and the left elbow feature point LU2. As a result, it is estimated that the left lower arm portion of the person as the subject 30 is the hidden body part.

According to such a processing, it is possible to improve the estimation accuracy of the hidden body part obstructed by the torso of the person whose back is facing the front of the imaging device 11.

Figure 18:
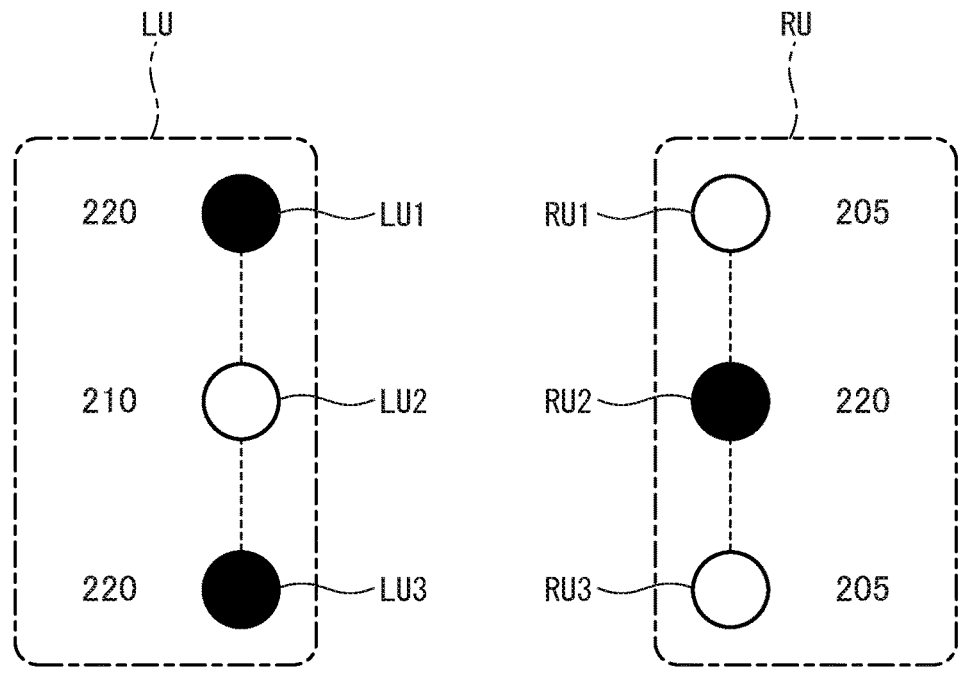
FIG. 18 is a diagram for explaining processing for estimating a hidden body part of a person as the subject.
Figure 18:
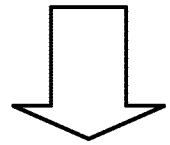
Figure 18:
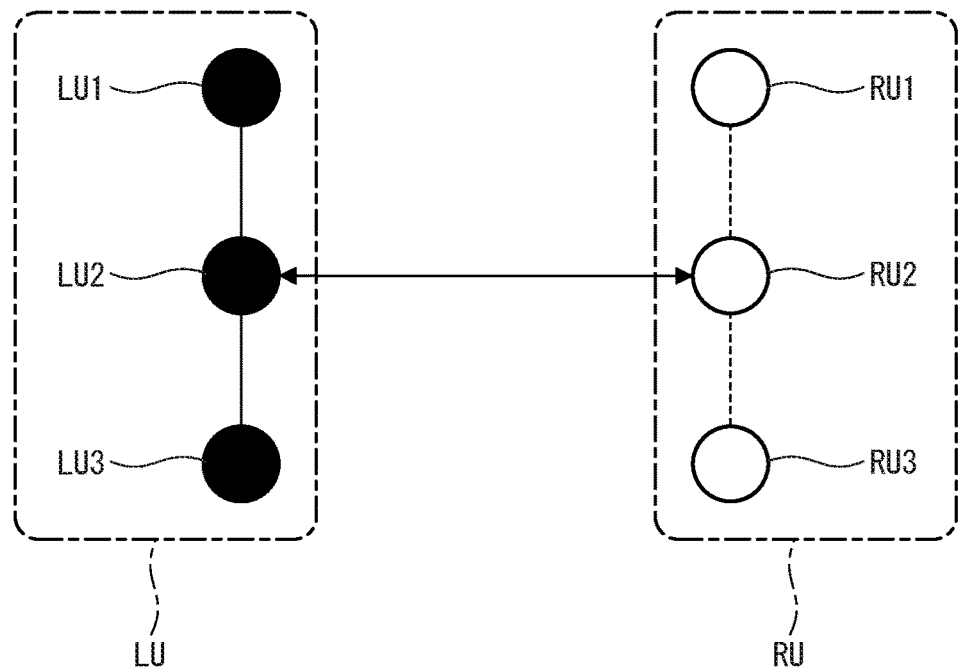

As described with reference to FIG. 13, as a result of estimating the hidden body part with reference to the likelihood assigned to each feature point, there would be a case where the presence of the hidden body part is estimated for both the left upper limb group LU and the right upper limb group RU, as illustrated in FIG. 18. Based on the connection rule of the skeleton lines described above, the presence of the hidden body part is estimated in both the left upper limb and the right upper limb located at relatively close positions. Such a posture is not realistic.

In a case where it is estimated that at least one of the feature points belonging to the left upper limb group LU is included in a hidden body part and at least one of the feature points belonging to the right upper limb group RU is included in a hidden body part, the processor 122 of the image processing device 12 handles all of the feature points belonging to one of the two groups as the feature points included in a hidden body part, and handles all of the feature points belonging to the other as the feature points included in a non-hidden body part. The feature points belonging to the left upper limb group LU are an example of the first feature points. The feature points belonging to the right upper limb group RU are an example of the second feature points.

In the example illustrated in FIG. 18, all the feature points included in the left upper limb group LU are handled as the feature points included in the non-hidden body part. As a result, all the feature points included in the left upper limb group LU are connected by the non-hidden skeleton lines. On the other hand, all the feature points included in the right upper limb group RU are handled as the feature points included in the hidden body part. As a result, all the feature points included in the right upper limb group RU are connected by the hidden skeleton lines.

The above-described switching of the estimation result relating to the hidden body part can be performed by acquiring a representative value of the likelihood assigned to each feature point, for example. Examples of the representative value include an average value, an intermediate value, a mode value, and a total value. The processor 122 compares a representative value of the likelihoods assigned to the feature points included in the left upper limb group LU with a representative value of the likelihoods assigned to the feature points included in the right upper limb group RU. The processor 122 handles all of the feature points included in the group associated with the smaller representative value as the feature points included in the hidden body part. The processor 122 handles all of the feature points included in the group associated with the larger representative value as the feature points included in the non-hidden body part.

In the example illustrated in FIG. 18, an average value of the likelihoods is acquired for each of the left upper limb group LU and the right upper limb group RU. The average value of the likelihoods in the left upper limb group LU is an example of the first representative value. The average value of the likelihoods in the right upper limb group RU is an example of the second representative value. The average value of the likelihoods in the left upper limb group LU is more than the average value of the likelihoods in the right upper limb group RU. Accordingly, all the feature points included in the left upper limb group LU are handled as the feature points included in the non-hidden body part, and all the feature points included in the right upper limb group RU are handled as the feature points included in the hidden body part.

Alternatively, the above-described switching of the estimation result relating to the hidden body part can be performed by counting the number of the feature point estimated to be included in the hidden body part in each group. The processor 122 compares the number of the feature point estimated to be included in the hidden body part among the feature points included in the left upper limb group LU with the number of the feature point estimated to be included in the hidden body part among the feature points included in the right upper limb group RU. The number of the feature point estimated to be included in the hidden body part among the feature points included in the left upper limb group LU is an example of the first value. The number of the feature point estimated to be included in the hidden body part among the feature points included in the right upper limb group RU is an example of the second value.

The processor 122 handles all of the feature points included in a group having a larger number of feature point estimated to be included in the hidden body part as the feature points included in the hidden body part. The processor 122 handles all of the feature points included in the group having a smaller number of feature point estimated to be included in the hidden body part as the feature points included in the non-hidden body part.

In the example illustrated in FIG. 18, the number of feature points estimated to be included in the hidden body part in the left upper limb group LU is less than the number of feature points estimated to be included in the hidden body part in the right upper limb group RU. Accordingly, all the feature points included in the left upper limb group LU are handled as the feature points included in the non-hidden body part, and all the feature points included in the right upper limb group RU are handled as the feature points included in the hidden body part.

According to the processing as described above, it is possible to correct an unnatural estimation result relating to the hidden body part. Accordingly, it is possible to improve the accuracy of discrimination of the subject 30 captured in the image I acquired by the imaging device 11.

These two processing may be performed in combination. For example, the processing based on the number of feature point estimated to be included in the hidden body part is performed first, and the processing based on the representative value of the likelihood may be performed in a case where the count results of both groups are the same. By combining processing with a relatively low load and processing with a relatively high accuracy, it is possible to efficiently perform the estimation relating to the hidden body part.

The above-described switching of the estimation result relating to the hidden body part with may be performed based on the direction of the face of the person as the subject 30. For example, in a case where the face of a person captured in the image I acquired by the imaging device 11 faces leftward, all of the feature points included in the fight upper limb of the person can be handled as the feature points included in the hidden body part.

The above description described with reference to FIG. 18 can be similarly applied to the feature points included in the left lower limb group LL and the feature points included in the right lower limb group RL. In this case, the feature points included in the left lower limb group LL are an example of the first feature points. The feature points included in the right lower limb group RL are an example of the second feature points. The representative value obtained for the likelihoods in the left leg group LL is an example of the first representative value. The representative value obtained for the likelihoods in the right lower limb group RL is an example of the second representative value. The number of the feature points estimated to be included in the hidden body part among the feature points included in the left leg group LL is an example of the first value. The number of the feature points estimated to be included in the hidden body part among the feature points included in the right lower limb group RL is an example of the second value.

The processor 122 having each function described above can be implemented by a general-purpose microprocessor operating in cooperation with a general-purpose memory. Examples of the general-purpose microprocessor include a CPU, an MPU, and a GPU. Examples of the general-purpose memory include a ROM and a RAM. In this case, a computer program for executing the above-described processing can be stored in the ROM. The ROM is an example of a non-transitory computer-readable medium having recorded a computer program. The general-purpose microprocessor designates at least a part of the program stored in the ROM, loads the program on the RAM, and executes the processing described above in cooperation with the RAM. The above-mentioned computer program may be pre-installed in a general-purpose memory, or may be downloaded from an external server via a communication network and then installed in the general-purpose memory. In this case, the external server is an example of the non-transitory computer-readable medium having stored a computer program.

The processor 122 may be implemented by an exclusive integrated circuit capable of executing the above-described computer program, such as a microcontroller, an ASIC, and an FPGA. In this case, the above-described computer program is pre-installed in a memory element included in the exclusive integrated circuit. The memory element is an example of a non-transitory computer-readable medium having stored a computer program. The processor 122 may also be implemented by a combination of the general-purpose microprocessor and the exclusive integrated circuit.

The above embodiments are merely illustrative for facilitating understanding of the gist of the presently disclosed subject matter. The configuration according to each of the above embodiments can be appropriately modified or changed without departing from the gist of the presently disclosed subject matter.

The image processing system 10 may be installed in a mobile entity other than the vehicle 20. Examples of the mobile entity include railways, aircrafts, and ships. The mobile entity may not require a driver. The imaging area A of the imaging device 11 may be defined inside the mobile entity.

The image processing system 10 need not be installed in a mobile entity such as the vehicle 20. The image processing system 10 can be used to control operation of a monitoring device, a locking device, an air conditioner, a lighting device, an audio-visual equipment, and the like equipped in a house or a facility.

The present application is based on Japanese Patent Application No. 2019-184714 filed on Oct. 7, 2019, the entire contents of which are incorporated herein by reference.

The invention claimed is:

1. An image processing system for controlling a controlled device, comprising:
   a reception interface configured to receive image data from an imaging device including a camera or an image sensor configured to obtain an image in which a person is captured, the image data corresponding to the image;
   an output interface; and
   a processor configured to estimate, based on the image data, a hidden body part of the person that is not captured in the image due to obstruction by another body part of the person,
   wherein the processor is configured to:
      detect, based on the image data, a plurality of first feature points included in a left limb of the person and a plurality of second feature points included in a right limb of the person;
      in a case where at least one of the first feature points and at least one of the second feature points are estimated to be included in the hidden body part, process either all the first feature points or all the second feature points as either the feature points included in the hidden body part or the feature points included in a non-hidden body part that is captured in the image without being obstructed by another body part of the person; and
      output, from the output interface, control data for controlling an operation of the controlled device based on a result of processing, the controlled device including at least one of a door opening/closing device, a monitoring device, a locking device, an air conditioner, a lighting device, and an audio-visual equipment;
   wherein, in a case where the first feature points are included in a left upper limb and the second feature points are included in a right upper limb, the first feature points and the second feature points are located symmetrically with a third feature point located in a face of the person facing front; and
   wherein in a case where the first feature points are included in a left lower limb and the second feature points are included in a right lower limb, the first feature points and the second feature points are located symmetrically with respect to a center axis relative to a left-right direction of a body of the person facing front.

2. The image processing system according to claim 1, wherein an index indicative of estimation reliability is assigned to each of the first feature points and the second feature points; and
wherein the processor is configured to:
  calculate a first representative value of the indices assigned to the first feature points;
  calculate a second representative value of the indices assigned to the second feature points; and
  process either all the first feature points or all the second feature points that is associated with a lower one of the first representative value and the second representative value as the feature points included in the hidden body part.

3. The image processing system according to claim 1, wherein the processor is configured to:
  count a first value that is the number of at least one first feature point estimated to be included in the hidden body part among the first feature points;
  count a second value that is the number of at least one second feature point estimated to be included in the hidden body part among the second feature points; and
  process either the at least one first feature point or the at least one second feature point associated with a higher one of the first value and the second value as a feature point included in the hidden body part.

4. A non-transitory computer-readable medium having stored a computer program adapted to be executed by a processor of an image processing system for controlling a controlled device, the computer program being configured, when executed, to cause the image processing system to:
  receive, by a reception interface, from an imaging device including a camera or an image sensor configured to obtain an image in which a person is captured, image data corresponding to the image;
  detect, based on the image data, a plurality of first feature points included in a left limb of the person and a plurality of second feature points included in a right limb of the person; and
  estimate at least one of the first feature points and at least one of the second points are included in a hidden body part of the person that is not captured in the image due to obstruction by another body part of the person;
  process either all the first feature points and all the second feature points as either the feature points included in the hidden body part or the feature points included in a non-hidden body part that is captured in the image without being obstructed by another body part of the person; and
  output, from an output interface, control data for controlling an operation of the controlled device based on a result of processing,
wherein the controlled device includes at least one of a door opening/closing device, a monitoring device, a locking device, an air conditioner, a lighting device, and an audio-visual equipment;
wherein the left limb includes a left upper limb and a left lower limb;
wherein the right limb includes a right upper limb and a right limb;
wherein the first feature points included in the left upper limb and the second feature points included in the right upper limb are located symmetrically with a third feature point located in a face of the person facing front; and
wherein the first feature points included in the left lower limb and the second feature points included in the right lower limb are located symmetrically with respect to a center axis relative to a left-right direction of a body of the person facing front.

5. The non-transitory computer-readable medium according to claim 4,
wherein an index indicative of estimation reliability is assigned to each of the first feature points and the second feature points; and
wherein the computer program is configured to, when executed, cause the image processing system to:
  calculate a first representative value of the indices assigned to the first feature points;
  calculate a second representative value of the indices assigned to the second feature points; and
  process all the first feature points or all the second feature points that is associated with a lower one of the first representative value and the second representative value as the feature points included in the hidden body part.

6. The non-transitory computer-readable medium according to claim 4,
wherein the computer program is configured to, when executed, cause the image processing system to:
  count a first value that is the number of at least one first feature point estimated to be included in the hidden body part among the first feature points;
  count a second value that is the number of at least one second feature point estimated to be included in the hidden body part among the second feature points; and
  process either the at least one first feature point or the at least one second feature point associated with a higher one of the first value and the second value as a feature point included in the hidden body part.

* * * * *

UNITED STATES PATENT AND TRADEMARK OFFICE
CERTIFICATE OF CORRECTION

| | |
|---|---|
| PATENT NO. | : 12,100,237 B2 |
| APPLICATION NO. | : 17/766928 |
| DATED | : September 24, 2024 |
| INVENTOR(S) | : H. Harada et al. |

Page 1 of 1

It is certified that error appears in the above-identified patent and that said Letters Patent is hereby corrected as shown below:

On the Title Page

Item (54) Title and in the Specification, Column 1, Line 4, please change "ACCURACE" to -- ACCURACY --.

Signed and Sealed this
Fourth Day of March, 2025

Coke Morgan Stewart
*Acting Director of the United States Patent and Trademark Office*